(12) United States Patent
Yarusso et al.

(10) Patent No.: US 11,118,088 B2
(45) Date of Patent: Sep. 14, 2021

(54) ADHESIVE ARTICLES INCLUDING A CUSHION LAYER AND A CONTINUOUS SHELL LAYER

(71) Applicant: 3M INNOVATIVE PROPERTIES COMPANY, St. Paul, MN (US)

(72) Inventors: David J. Yarusso, Shoreview, MN (US); Ross E. Behling, Woodbury, MN (US); Peter M. Simone, Woodbury, MN (US); Chaodi Li, Woodbury, MN (US); Zhong Chen, Woodbury, MN (US); Sharon Wang, St. Paul, MN (US); Jingjing Ma, Cottage Grove, MN (US); Eric D. Shockey, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/733,208

(22) PCT Filed: Dec. 14, 2018

(86) PCT No.: PCT/IB2018/060125
§ 371 (c)(1),
(2) Date: Jun. 10, 2020

(87) PCT Pub. No.: WO2019/123180
PCT Pub. Date: Jun. 27, 2019

(65) Prior Publication Data
US 2020/0369926 A1   Nov. 26, 2020

Related U.S. Application Data

(60) Provisional application No. 62/608,673, filed on Dec. 21, 2017.

(51) Int. Cl.
*C09J 7/38* (2018.01)
*C09J 133/08* (2006.01)

(52) U.S. Cl.
CPC ............ *C09J 7/385* (2018.01); *C09J 133/08* (2013.01); *C09J 2301/208* (2020.08); *C09J 2301/302* (2020.08); *C09J 2433/00* (2013.01); *Y10T 428/28* (2015.01); *Y10T 428/2848* (2015.01); *Y10T 428/2891* (2015.01)

(58) Field of Classification Search
None
See application file for complete search history.

(56) References Cited

U.S. PATENT DOCUMENTS

| | | | |
|---|---|---|---|
| 4,181,752 A | 1/1980 | Martens | |
| 4,619,979 A | 10/1986 | Kotnour | |
| 4,828,871 A | 5/1989 | Strobel | |
| 4,843,134 A | 6/1989 | Kotnour | |
| 5,637,646 A | 6/1997 | Ellis | |
| 5,804,610 A | 9/1998 | Hamer | |
| 5,827,609 A * | 10/1998 | Ercillo | B05C 5/0254 428/354 |
| 5,986,011 A | 11/1999 | Ellis | |
| 6,187,432 B1 | 2/2001 | Krish | |
| 6,416,858 B1 | 7/2002 | Ercillo | |
| 6,565,697 B1 | 5/2003 | Maercklein | |
| 6,630,049 B2 | 10/2003 | Hannington | |
| 6,919,405 B2 | 7/2005 | Kinning | |
| 8,012,581 B2 | 9/2011 | Husemann | |
| 8,029,911 B2 | 10/2011 | Nomura | |
| 8,263,718 B2 | 9/2012 | Ellis | |
| 8,945,717 B2 | 2/2015 | Husemann | |
| 9,109,141 B2 | 8/2015 | Inenaga | |
| 2004/0260024 A1 * | 12/2004 | Gehlsen | C09J 7/26 525/227 |
| 2010/0055435 A1 | 3/2010 | Neubert | |

(Continued)

FOREIGN PATENT DOCUMENTS

| | | |
|---|---|---|
| EP | 0315072 | 5/1989 |
| EP | 0454365 | 10/1991 |

(Continued)

OTHER PUBLICATIONS

Mattioni, Prediction of Glass Transition Temperatures from Monomer and Repeat Unit Structure Using Computational Neural Networks, Journal for Chemical Information and Computer Scientists, 2002, vol. 42, pp. 232-240.
Satas, Handbook of Pressure Sensitive Adhesive Technology, 2nd Edition, Van Nostrand Reinhold, New York, 1989, pp. 172-173.
Yarusso, "Quantifying the Relationship Between Peel and Rheology for Pressure Sensitive Adhesives," Journal of Adhesion, 1999, vol. 70, pp. 299-320.

(Continued)

Primary Examiner — Anish P Desai
(74) Attorney, Agent, or Firm — Jean A. Lown

(57) ABSTRACT

An adhesive article including: a flexible backing; a first cushion layer permanently bonded to a first surface of the flexible backing, wherein the first cushion layer: has an average thickness of at least 10 micrometers; and includes an acrylate pressure-sensitive adhesive having a Fox Tg of up to −30° C., wherein the acrylate pressure-sensitive adhesive includes a (meth)acrylate copolymer; and a first continuous shell layer adjacent the first cushion layer, wherein: the first continuous shell layer has an average thickness of up to 25 micrometers; the ratio of the first cushion layer average thickness to the first shell layer average thickness is at least 2:1; the first continuous shell layer includes an adhesive having a Fox Tg of −20° C. to +50° C.; and the first continuous shell layer adhesive includes a copolymer having a weight average molecular weight of at least 100,000 Daltons.

20 Claims, 1 Drawing Sheet

(56) References Cited

U.S. PATENT DOCUMENTS

| | | | |
|---|---|---|---|
| 2010/0086778 A1 | 4/2010 | Fidan | |
| 2011/0195240 A1* | 8/2011 | Inenaga | G06F 3/045 |
| | | | 428/215 |
| 2013/0078463 A1 | 3/2013 | Okamoto | |
| 2014/0193598 A1 | 7/2014 | Traser | |
| 2015/0125675 A1 | 5/2015 | Yoon | |
| 2016/0009957 A1 | 1/2016 | Griffith | |
| 2017/0009105 A1 | 1/2017 | Baetzold | |
| 2017/0253771 A1 | 9/2017 | Lee | |
| 2020/0332152 A1* | 10/2020 | Simone | B32B 7/12 |

FOREIGN PATENT DOCUMENTS

| | | |
|---|---|---|
| EP | 2479229 | 7/2012 |
| EP | 2557132 | 2/2013 |
| EP | 2573149 | 3/2013 |
| EP | 2735595 | 5/2014 |
| EP | 2803712 | 11/2014 |
| EP | 2851406 | 3/2015 |
| JP | S56-055476 | 5/1981 |
| JP | 3878386 | 2/2007 |
| JP | 2010-161167 | 7/2010 |
| WO | WO 2002-018508 | 3/2002 |
| WO | WO 2012-088126 | 6/2012 |
| WO | WO 2012-152710 | 11/2012 |
| WO | WO 2013-101827 | 7/2013 |
| WO | WO 2014-130507 | 8/2014 |
| WO | WO 2016-039521 | 3/2016 |
| WO | WO 2017-058499 | 4/2017 |
| WO | WO 2017-112438 | 6/2017 |
| WO | WO 2019-123181 | 6/2019 |

OTHER PUBLICATIONS

International Search Report for PCT International Application No. PCT/IB2018/060125, dated Apr. 4, 2019, 5 pages.
International Search Report for PCT International Application No. PCT/IB2018/060126, dated Feb. 22, 2019, 5 pages.

* cited by examiner

ADHESIVE ARTICLES INCLUDING A CUSHION LAYER AND A CONTINUOUS SHELL LAYER

CROSS REFERENCE TO RELATED APPLICATIONS

This application is a national stage filing under 35 U.S.C. 371 of PCT/IB2018/060125, filed Dec. 14, 2018, which claims the benefit of U.S. Provisional Patent Application No. 62/608,673, filed Dec. 21, 2017, the disclosure of which is incorporated by reference in its/their entirety herein.

BACKGROUND

Pressure sensitive adhesives are well known and used in many industrial applications. It is also known that optimization of such adhesives for a given application requires a balance of properties that are often in opposition to one another. The properties typically desired are peel adhesion strength (at a variety of speeds and temperatures), tack or rapid bonding with minimal pressure, and shear resistance or ability to hold loads for extended time. For example, one often sees that increases in shear resistance are accompanied by reductions in tack and/or peel adhesion strength. Adhesives designed for good tack and peel at room temperature and moderate peel speeds may have poor peel adhesion strength at low peel rates and/or high temperature. Improving the high temperature and/or low speed peel adhesion strength, however, often results in low tack.

The need for a better combination of adhesion performance at room temperature and at high temperature along with better performance on low energy surfaces is common in many applications (e.g., in the automotive and electronics bonding areas) under ever more demanding requirements, particularly where high temperature lifting resistance and relatively low tack are desirable properties. Thus, there continues to be a need for new adhesive articles.

SUMMARY

Provided herein are adhesive articles that include a cushion layer and a continuous shell layer. Such two-layer adhesives can provide a unique balance of properties and design control for different applications.

More specifically, provided herein is an adhesive article including: a flexible backing; a first cushion layer permanently bonded to a first surface of the flexible backing, wherein the first cushion layer: has an average thickness of at least 10 micrometers; and includes an acrylate pressure-sensitive adhesive having a Fox Tg (glass transition temperature) of up to −30° C., wherein the acrylate pressure-sensitive adhesive includes a (meth)acrylate copolymer; and a first continuous shell layer adjacent the first cushion layer, wherein: the first continuous shell layer has an average thickness of up to 25 micrometers; the ratio of the first cushion layer average thickness to the first shell layer average thickness is at least 2:1; the first continuous shell layer includes an adhesive having a Fox Tg of −20° C. to +50° C.; and the first continuous shell layer adhesive includes a copolymer having a weight average molecular weight of at least 100,000 Daltons.

The acrylate pressure-sensitive adhesive of the first cushion layer includes a (meth)acrylate copolymer including:
a) one or more (meth)acrylate monomeric units of Formula (I) in an amount of at least 60 percent by weight (wt-%), based on a total weight of monomeric units in the (meth)acrylate copolymer:

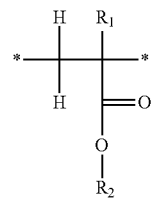

wherein:
R$_1$ is hydrogen or a methyl group; and
R$_2$ is an alkyl, heteroalkyl, aryl, aralkyl, or alkaryl group; with the proviso that the first monomeric unit of Formula (I) with R$_2$ having at least 8 carbon atoms is present in an amount of at least 20 wt-%, based on a total weight of monomeric units in the (meth)acrylate copolymer; and
b) one or more polar monomeric units in an amount of up to 7 wt-%, based on a total weight of monomeric units in the (meth)acrylate copolymer;
wherein the sum of all monomeric units (i.e., monomeric units (a) and (b) plus any optional monomeric units) of the first cushion layer (meth)acrylate copolymer equals 100% by weight.

The first continuous shell layer adhesive (which may be a pressure-sensitive adhesive) includes a copolymer having a weight average molecular weight of at least 100,000 Daltons, wherein the copolymer includes:
a) one or more low Tg (meth)acrylate monomeric units of Formula (II) in an amount of at least 25 wt-%, based on a total weight of monomeric units in the copolymer:

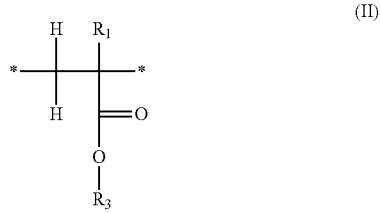

wherein:
R$_1$ is hydrogen or a methyl group; and
R$_3$ is an alkyl, heteroalkyl, aryl, aralkyl, or alkaryl group;
b) one or more polar monomeric units in an amount of up to 5 wt-%, based on a total weight of monomeric units in the copolymer; and
c) one or more high Tg nonpolar monomeric units in an amount of at least 35 wt-%, based on a total weight of monomeric units in the copolymer;
wherein the sum of all monomeric units (i.e., monomeric units (a), (b), and (c) plus any optional monomeric units) of the first shell layer copolymer equals 100% by weight.

As used herein, the term "(meth)acrylate" refers to a methacrylate and an acrylate.

As used herein, the term "(meth)acrylamide" refers to a methacrylamide and an acrylamide.

As used herein, the term "adjacent" can be used to refer to two materials, typically in the form of layers, that are in direct contact or that are separated by one or more other materials, such as a flexible backing layer and an adhesive layer with a chemical primer layer there between. Often, adjacent materials are in direct contact (e.g., an adhesive layer directly disposed on a flexible backing layer).

As used herein, an asterisk (*) shows the location of attachment of the monomeric unit to another group or monomeric unit.

According to the Pressure-Sensitive Tape Council, pressure-sensitive adhesives (PSAs) are defined to possess the following properties: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). Materials that are merely sticky or adhere to a surface do not constitute a PSA; the term PSA encompasses materials with additional viscoelastic properties.

This criterion defines a pressure sensitive adhesive as an adhesive having a 1 second creep compliance of greater than $1\times10^{-6}$ cm$^2$/dyne as described in *Handbook of Pressure Sensitive Adhesive Technology*, Donatas Satas (Ed.), 2$^{nd}$ Edition, p. 172, Van Nostrand Reinhold, New York, N.Y., 1989. Alternatively, since modulus is, to a first approximation, the inverse of creep compliance, pressure sensitive adhesives may be defined as adhesives having a Young's modulus of less than $1\times10^6$ dynes/cm$^2$.

Glass Transition Temperature (Tg) values may also be calculated using the Fox equation. The calculation is based on the weighted average of the individual homopolymer glass transition values. For a copolymer prepared from n different monomers, the inverse of the Tg of the copolymer is equal to the summation of the weight fraction of each component divided by the Tg of that particular component (expressed in absolute temperature units, such as Kelvin). That is, for a copolymer prepared from n components, 1/Tg of the copolymer is equal to (weight fraction of component one÷Tg of component one)+(weight fraction of component two÷Tg of component two)+(weight fraction of component 3÷Tg of component 3)+ . . . +(weight fraction of component n÷Tg of component n). Lists of glass transition temperatures for homopolymers are available from multiple monomer suppliers such as from BASF Corporation (Houston, Tex., USA), Polyscience, Inc. (Warrington, Pa., USA), and Aldrich (Saint Louis, Mo., USA) as well as in various publications such as, for example, Mattioni et al., *J. Chem. Inf Comput. Sci.*, 2002, 42, 232-240.

As used herein, "alkyl" refers to a monovalent group that is a radical of an alkane and includes straight-chain, branched, cyclic, and bicyclic alkyl groups, and combinations thereof. Unless otherwise indicated, the alkyl groups typically contain from 1 to 24 carbon atoms. There can be at least 2, at least 3, or at least 4 carbon atoms and up to 24, up to 20, up to 18, up to 16, up to 12, up to 10, up to 6, up to 4, or up to 3 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. In certain embodiments, the alkyl groups include 2 to 24 carbon atoms or 4 to 24 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. There can be at least 10, or at least 14 carbon atoms and up to 24, up to 20, up to 18, up to 12, or up to 10 carbon atoms. In some embodiments, the aryl groups contain 6 to 24, 6 to 20, 6 to 18, 6 to 16, 6 to 12, or 6 to 10 carbon atoms. Examples of an aryl group include phenyl, naphthyl, biphenyl, phenanthryl, and anthracyl.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms, and an aryl portion often has 6 to 24 carbon atoms, 6 to 20 carbon atoms, 6 to 18 carbon atoms, 6 to 16 carbon atoms, 6 to 12 carbon atoms, or 6 to 10 carbon atoms.

The term "heteroalkyl" means an alkyl group having at least one —CH$_2$— replaced with a heteroatom such as NR, O, or S, wherein R is H or an alkyl group. There can be more than one heteroatom such as 1 to 10, 1 to 6, 1 to 4, or 1 to 3 heteroatoms. The number of carbons is the same as described for an alkyl group. The heteroatom can replace any —CH$_2$— in the alkyl group but two heteroatoms are separated by at least one —CH$_2$— group.

The phrase "permanently bonded" in the context of a bond formed between an adhesive (particularly a pressure-sensitive adhesive) and a flexible backing means the bond fails cohesively before adhesive failure from the flexible backing is observed when the adhesive is stressed by some means (most commonly a peel or tensile mode).

The term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful and is not intended to exclude other claims from the scope of the disclosure.

In this application, terms such as "a," "an," and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also, herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also, herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability.

When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one R group is present in a formula, each R group is independently selected.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION

Provided herein are adhesive articles that include a cushion layer and a continuous shell layer. The continuous shell layer is the outer layer that comes in contact with the target substrate to which the adhesive article is applied. It is thinner and includes an adhesive having a higher glass transition temperature (Tg) than that of the cushion layer.

Selection of the materials for the cushion layer and the shell layer can provide a unique balance of properties for a variety of applications. For example, the two-layer adhesives can provide better combination of adhesion performance at room temperature and at higher temperatures along with better performance on low energy surfaces. Significantly, in certain embodiments, adhesive articles of the present disclosure demonstrate enhanced adhesion at low peel rates and/or high temperatures while still retaining useful tack, compared to either of the single adhesive layers used alone, which would be lacking in one or both performance attributes. Furthermore, such advantages can be achieved without the need to use a foam in the core or any component of the adhesive article, which is desirable for applications in which optical transparency, incompressibility, or thinner overall constructions are desired. Neither the core nor that shell is typically a foam.

The ability to modify the tack very precisely is a highly desirable performance attribute of adhesives, particularly PSAs. Furthermore, to do this with only a nominal impact on the total PSA performance (e.g., shear and peel behavior) would be highly desirable. In one example, the placement and positioning of large graphic films with PSA attachments on a vehicle, such as used in the commercial graphics business, can be quite challenging requiring many different solutions. To aid placement while avoiding immediate PSA adhesion, these solutions range from the application of soap and water to the vehicle prior to adhesion, to more complicated solutions requiring non-tacky ceramic posts to be adhered to the surface of the PSA. Such posts effectively reduce the peel performance of the PSA by reducing area of adhesion onto the vehicle.

The adhesive articles of the present disclosure provide a unique solution to overcome these challenges. The use of a higher Tg adhesive in a shell layer on an underlying PSA not only allows for positioning of the article, but also can enhance the final PSA performance. This can be achieved, for example, by adjusting the thickness of the higher Tg adhesive shell layer and thus changing the tack (or rolling ball distance) of the article. Additionally, increasing the Tg of the higher Tg continuous shell layer may also decrease the tack (or inversely increase the rolling ball distance).

Figure 1:
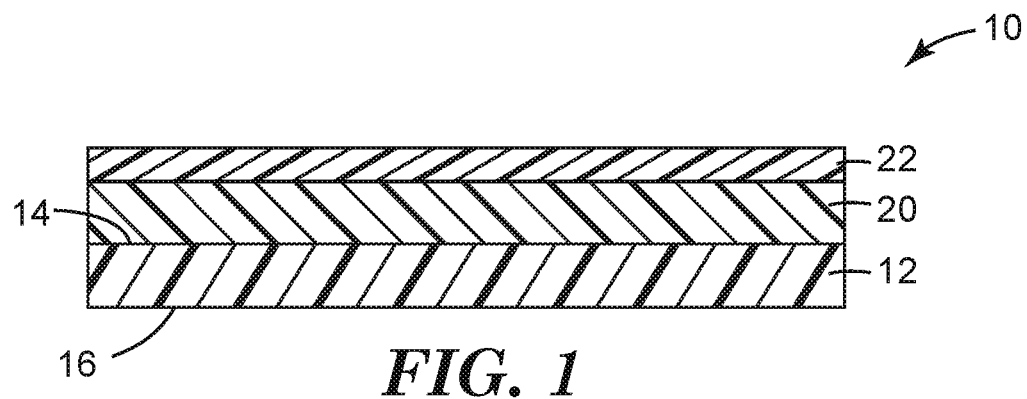
FIG. 1 is a cross-sectional representation of an embodiment of an adhesive article of the present disclosure (not necessarily to scale).

As shown in FIG. 1, an adhesive article (e.g., tape) 10 of the present disclosure includes a flexible backing 12 having a first surface 14 and a second surface 16, a first cushion layer 20 permanently bonded to the first surface 14 of the flexible backing 12, and a first continuous shell layer 22 adjacent the first cushion layer 20.

Figure 2:
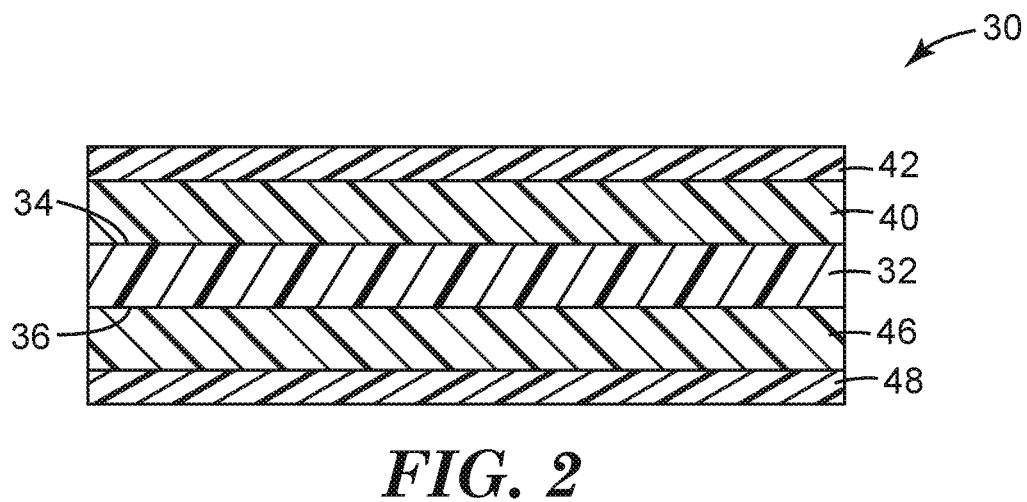
FIG. 2 is a cross-sectional representation of another embodiment of an adhesive article of the present disclosure (not necessarily to scale).

Herein, use of the term "first" does not necessarily require that there has to be a second cushion layer and/or a second continuous shell layer, although in certain embodiments, the adhesive articles do include a second cushion layer and a second continuous shell layer. Thus, as shown in FIG. 2, in certain embodiments, an adhesive article 30 of the present disclosure includes a flexible backing 32 having a first surface 34 and a second surface 36, a first cushion layer 40 permanently bonded to the first surface 34 of the flexible backing 32, a first continuous shell layer 42 adjacent the first cushion layer 40, as well as a second cushion layer 46 permanently bonded to the second surface 36 (i.e., second side) of the flexible backing 32, and a second continuous shell layer 48 adjacent the second cushion layer 46.

The ability to tune the adhesive properties of the first shell layer 42 independently of the second shell layer 48 may allow for enhanced peel performance when bonding dissimilar substrates to either surface of the adhesive article. For example, an adhesive article of the present disclosure could include a relatively low Tg first shell layer 42 to position adjacent a first substrate and a relatively high Tg second shell layer 48 to position adjacent a second substrate. The second substrate could be more easily positioned and aligned relative to the first substrate prior to creating a bond.

Herein, reference to a cushion layer includes reference to a first and/or second cushion layer, and reference to a shell layer includes reference to a first and/or second shell layer.

A cushion layer (first and/or second) has an average thickness of at least 10 micrometers. In certain embodiments, a cushion layer has an average thickness of at least 20 micrometers, at least 30 micrometers, or at least 50 micrometers and up to 150 micrometers, up to 125 micrometers, up to 100 micrometers, up to 75 micrometers, or up to 50 micrometers.

A continuous shell layer has an average thickness of up to 25 micrometers. Above this thickness the continuous shell layer may behave as a self-supporting film of the shell by itself and thus negate the beneficial effects of the bilayer construction. In certain embodiments, a continuous shell layer has an average thickness of up to 20 micrometers, up to 12 micrometers, up to 10 micrometers, up to 8 micrometers, up to 6 micrometers, up to 4 micrometers, or up to 2 micrometers.

A ratio of the cushion layer average thickness to the shell layer average thickness is at least 2:1. In certain embodiments, the ratio of the cushion layer average thickness to the continuous shell layer average thickness is at least 3:1, at least 4:1, at least 5:1, at least 10:1, at least 20:1, at least 50:1, or at least 70:1. In certain embodiments, the ratio of the cushion layer average thickness to the shell layer average thickness is up to 300:1, up to 200:1, up to 100:1, or up to 50:1.

The relatively thin shell layer that includes the higher Tg adhesive provides an increase in the debonding force required to separate the adhesive from a substrate, in comparison to the debonding force of the lower Tg adhesive of the underlying cushion layer alone. Additionally, the lower Tg adhesive of the cushion layer provides the necessary conformability for good substrate wetting and energy dissipation that would be lacking in the higher Tg adhesive of the overlying shell layer alone. These composite properties are what leads to the significant improvement in bond performance (i.e., peel force/resistance) observed for the adhesive articles of the present disclosure.

In certain embodiments, an adhesive article of the present disclosure demonstrates an increase (in certain embodiments, at least a two-fold increase, or at least a three-fold increase) in 180° angle peel adhesion strength at a peel rate of 0.2 inch/minute (0.08 millimeter/second) from stainless steel at room temperature compared to an adhesive article having the same flexible backing and first cushion layer but without the first shell layer, if measured on the first side of the adhesive article (or the second cushion layer but without the second shell layer, if measured on the second side of the adhesive article).

Herein, "peel rate" refers to the rate of propagation of the peel front relative to the substrate to which the adhesive is applied. That is, the speed of pulling the tape relative to the peel front rate depends on the peel angle. For example, when peeling at an angle of 180 degrees, the peel front rate is one-half the pulling speed.

In certain embodiments, an adhesive article of the present disclosure demonstrates an increase (in certain embodiments, at least a two-fold increase, or at least a three-fold increase) in 180° angle peel adhesion strength at a peel rate of 0.2 inch/minute (0.08 millimeter/second) from stainless steel at a temperature of up to 65° C. compared to an adhesive article having the same flexible backing and first cushion layer but without the first shell layer, if measured on the first side of the adhesive article (or the second cushion layer but without the second shell layer, if measured on the second side of the adhesive article).

In certain embodiments, an adhesive article of the present disclosure demonstrates an increase (in certain embodiments, at least a two-fold increase, or at least a three-fold increase) in 180° angle peel adhesion strength at a peel rate of 0.2 inch/minute (0.08 millimeter/second) from polypropylene at a temperature of 65° C. compared to an adhesive article having the same flexible backing and first cushion layer but without the first shell layer, if measured on the first side of the adhesive article (or the second cushion layer but without the second shell layer, if measured on the second side of the adhesive article).

In certain embodiments, an adhesive article of the present disclosure demonstrates an average rolling ball stopping distance according to a Rolling Ball Tack Test (as described in Examples Section) of at least 200 millimeters (mm), at least 300 mm, or at least 400 mm.

Cushion Layer Acrylate Pressure-Sensitive Adhesive

A cushion layer (first and/or second) includes an acrylate pressure-sensitive adhesive having a Fox Tg of up to −30° C. The Fox Tg can be, for example, up to −35° C., up to −40° C., up to −45° C., or up to −50° C. In certain embodiments, the acrylate pressure-sensitive adhesive of the cushion layer has a Fox Tg of at least −85° C., at least −80° C., at least −75° C., at least −70° C., at least −65° C., or at least −60° C.

In certain embodiments, a cushion layer (meth)acrylate copolymer has a weight average molecular weight of at least 100,000 Daltons, at least 150,000 Daltons, at least 200,000 Daltons, at least 300,000 Daltons, or at least 400,000 Daltons. In certain embodiments, a cushion layer (meth)acrylate copolymer has a weight average molecular weight of up to 2,000,000 Daltons, up to 1,500,000 Daltons, up to 1,000,000 Daltons, up to 700,000 Daltons, or up to 500,000 Daltons.

The acrylate pressure-sensitive adhesive of the cushion layers (first and/or second) includes a (meth)acrylate copolymer that includes:

a) one or more (meth)acrylate monomeric units of Formula (I):

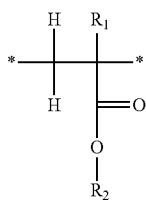

wherein:
R$_1$ is hydrogen or a methyl group; and
R$_2$ is an alkyl, heteroalkyl, aryl, aralkyl, or alkaryl group; and b) one or more polar monomeric units.

The one or more (meth)acrylate monomeric units (a) of Formula (I) are present in a cushion layer (meth)acrylate copolymer in an amount of at least 60 wt-%, at least 65 wt-%, at least 70 wt-%, at least 75 wt-%, or at least 80 wt-%, based on a total weight of monomeric units in the (meth) acrylate copolymer. In certain embodiments, a cushion layer (meth)acrylate copolymer includes one or more (meth) acrylate monomeric units (a) of Formula (I) in an amount of up to 99.5 wt-%, up to 95 wt-%, up to 90 wt-%, or up to 85 wt-%, based on a total weight of monomeric units in the (meth)acrylate copolymer.

The one or more polar monomeric units (b) are present (i.e., they are present in an amount of greater than 0 wt-%) in a cushion layer (meth)acrylate copolymer in an amount of up to 7 wt-%, up to 6 wt-%, up to 5 wt-%, or up to 4 wt-%, based on a total weight of monomeric units in the (meth) acrylate copolymer. In certain embodiments, a cushion layer (meth)acrylate copolymer includes one or more polar monomeric units (b) in an amount of at least 0.5 wt-%, at least 1 wt-%, at least 1.5 wt-%, at least 2 wt-%, at least 2.5 wt-%, or at least 3 wt-%, based on a total weight of monomeric units in the (meth)acrylate copolymer.

Herein, the sum of all monomeric units (a) and (b) and any optional monomeric units of the cushion layer (meth)acrylate copolymer equals 100% by weight.

In Formula (I) of the monomeric units of the cushion layer (meth)acrylate copolymer, R$_2$ is an alkyl, heteroalkyl, aryl, aralkyl, or alkaryl group. Alkyl groups often have 1 to 24 carbon atoms, 4 to 24 carbon atoms, 4 to 20 carbon atoms, 2 to 20 carbon atoms, 4 to 12 carbon atoms, 2 to 12 carbon atoms, or 2 to 10 carbon atoms. Heteroalkyl groups often have 2 to 24, 4 to 24 carbon atoms, 4 to 20 carbon atoms, or 4 to 12 carbon atoms. Aryl groups often have 6 to 24 carbon atoms, 6 to 20 carbon atoms, 6 to 12 carbon atoms, or 6 to 10 carbon atoms. Aralkyl and alkaryl groups often have an aryl or arylene portion with 6 to 20 carbon atoms, 6 to 12 carbon atoms, or 6 to 10 carbon atoms and an alkyl or alkylene portion with 1 to 10 carbon atoms, 1 to 6 carbon atoms, or 1 to 4 carbon atoms.

In certain embodiments of Formula (I) of the monomeric units of the cushion layer (meth)acrylate copolymer, R$_2$ is an alkyl group having 1 to 24 carbon atoms. In certain embodiments of Formula (I) of the monomeric units of the cushion layer (meth)acrylate copolymer, R$_2$ is an alkyl group having 4 to 24 carbon atoms.

In certain embodiments, the monomeric unit of Formula (I) of the monomeric units of the cushion layer (meth) acrylate copolymer includes R$_2$ groups having at least 8 carbon atoms (e.g., alkyl groups with at least 8 carbon atoms). In such embodiments, these monomeric units are present in an amount of at least 20 wt-%, at least 25 wt-%, at least 30 wt-%, at least 35 wt-%, at least 40 wt-% or even higher, based on a total weight of monomeric units in the (meth)acrylate copolymer. In some embodiments, all the monomeric units (a) of Formula (I) have at least 8 carbon atoms. That is, the amount of these monomer units can be in a range of 20 wt-% to 99.5 wt-% based on a total weight of monomeric units in the (meth)acrylate copolymer. The amount is often up to 99 wt-%, up to 95 wt-%, up to 90 wt-%, up to 85 wt-%, up to 80 wt-%, up to 75 wt-%, up to 70 wt-%, up to 65 wt-%, or up to 60 wt-%.

In certain embodiments, a cushion layer (meth)acrylate copolymer includes one or more (meth)acrylate monomeric units of Formula (I) derived from monomers such as 2-ethylhexyl (meth)acrylate, methyl (meth)acrylate, ethyl (meth) acrylate, n-butyl (meth)acrylate, isobutyl (meth)acrylate, cyclohexyl (meth)acrylate, hexyl (meth)acrylate, 2-octyl (meth)acrylate, isooctyl (meth)acrylate, isononyl (meth) acrylate, isobornyl (meth)acrylate, norbornyl (meth)acrylate, isostearyl (meth)acrylate, behenyl (meth)acrylate, 2-methylbutyl (meth)acrylate, and combinations thereof. In certain embodiments, a cushion layer (meth)acrylate copolymer includes one or more (meth)acrylate monomeric units of Formula (I) derived from monomers selected from the group of 2-ethylhexyl acrylate, n-butyl acrylate, isooctyl acrylate, 2-octyl acrylate, and combinations thereof. Various isomer mixtures of the alkyl (meth)acrylates can be used as those described, for example, in PCT Patent Application Publication WO 2012/088126 (Clapper et al.).

In certain embodiments, a cushion layer (meth)acrylate copolymer includes one or more polar monomeric units that are derived from polar monomers. As used herein, the term "polar monomer" refers to a monomer having a single ethylenically unsaturated group and a polar group selected from the group of a hydroxyl group, an acidic group, a basic group (such as a primary amido group, a secondary amido group, a tertiary amido group, or an amino group). In contrast, herein "nonpolar monomer" does not include such polar groups.

The polar group can be in the form of a salt. For example, the acidic group can be in the form of an anion and can have a cationic counter ion. In many embodiments, the cationic counter ion is an alkaline metal ion (e.g., sodium, potassium, or lithium ion), an alkaline earth ion (e.g., calcium, magnesium, or strontium ion), an ammonium ion, or an ammonium ion substituted with one or more alkyl or aryl groups. The various amido or amino groups can be in the form of a cation and can have an anionic counter ion. In many embodiments, the anionic counter ion is a halide, acetate, formate, sulfate, phosphate, or the like.

Useful acid-functional monomers include acrylic acid, methacrylic acid, itaconic acid, maleic acid, fumaric acid, and combinations thereof. Anhydrides, such as maleic anhydride and methacrylic acid anhydride can also be used. The anhydrides can be ring opened to provide acid groups.

Useful hydroxyl-functional monomers typically have a hydroxyl equivalent weight of less than 400. The hydroxyl equivalent molecular weight is defined as the molecular weight of the monomeric compound divided by the number of hydroxyl groups in the monomeric compound. Useful monomers of this type include 2-hydroxyethyl acrylate and methacrylate, 3-hydroxypropyl acrylate and methacrylate, 2-hydroxypropyl acrylate and methacrylate, 4-hydroxybutyl acrylate and methacrylate, 2-hydroxyethylacrylamide, and 3-hydroxypropylacrylamide. Additionally, hydroxyl functional monomers based on glycols derived from ethylenoxide or propyleneoxide can also be used. Various combinations of such monomers can be used, if desired.

Polar monomers may also include amido groups, such as primary amido groups including (meth)acrylamide, and secondary amido groups including N-alkyl (meth)acrylamides (e.g., N-methyl (meth)acrylamide, N-ethyl (meth)acrylamide, N-isopropyl (meth)acrylamide, N-tert-octyl (meth)acrylamide, or N-octyl (meth)acrylamide), and tertiary amido groups including N-vinyl caprolactam, N-vinyl-2-pyrrolidone, (meth)acryloyl morpholine, and N,N-dialkyl (meth)acrylamides (e.g., N,N-dimethyl (meth)acrylamide, N,N-diethyl (meth)acrylamide, N,N-dipropyl (meth)acrylamide, and N,N-dibutyl (meth)acrylamide).

Polar monomers may also include an amino group such as various N,N-dialkylaminoalkyl (meth)acrylates and N,N-dialkylaminoalkyl (meth)acrylamides. Examples include, but are not limited to, N,N-dimethylaminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide.

In certain embodiments, a cushion layer (meth)acrylate copolymer comprises one or more polar monomeric units derived from polar monomers selected from the group of (meth)acrylic acid, (meth)acrylamide, alkyl-substituted (meth)acrylamides (e.g., N,N-dimethyl acrylamide), and combinations thereof.

One or more optional other monomeric units may be included in a cushion layer (meth)acrylate copolymer of the present disclosure.

In certain embodiments, a cushion layer (meth)acrylate copolymer further includes vinyl acetate monomeric units. Generally, vinyl acetate is used as a scavenger of residual (meth)acrylate monomers as described in U.S. Pat. No. 8,263,718 (Ellis). Typically, such vinyl monomeric units are present in an amount of up to 7 wt-%, based on the total weight of monomeric units in the copolymer. For example, the amounts can be up to 5 wt-%, up to 3 wt-%, up to 2 wt-%, or up to 1 wt-%. The amount, if present, is often at least 0.1 wt-%, at least 0.2 wt-%, at least 0.5 wt-%, or at least 1 wt-%, In addition to a (meth)acrylate copolymer, in certain embodiments, a cushion layer acrylate pressure-sensitive adhesive further includes one or more additives selected from the group of colorants, fillers, flame retardants, antioxidants, UV-stabilizers, viscosity modifiers, and combinations thereof. For example, antioxidants and/or UV stabilizers such as hydroquinone monomethyl ether (4-methoxyphenol, MeHQ), and that available under the trade name IRGANOX 1010 (tetrakis(methylene(3,5-di-tert-butyl-4-hydroxyhydrocinnamnate))methane) from BASF Corp., can be mixed with the cushion layer (meth)acrylate copolymer to increase its temperature stability. If used, an antioxidant and/or stabilizer is typically used in the range of 0.01 wt-% to 1.0 wt-%, based on the total weight of the acrylate pressure-sensitive adhesive. For example, the amounts can be at least 0.01 wt-%, 0.02 wt-%, at least 0.05 wt-%, at least 0.1 wt-%, or at least 0.2 wt-% and up to 1.0 wt-%, up to 0.8 wt-%, up to 0.6 wt-%, or up to 0.5 wt-%.

In certain embodiments, a cushion layer acrylate pressure-sensitive adhesive includes tackifiers and/or plasticizers in a combined amount of no more than 20 wt-%. The amount can be up to 18 wt-%, up to 16 wt-%, up to 15 wt-%, up to 12 wt-%, or up to 10 wt-%, The amount can be at least 0.1 wt-%, at least 0.2 wt-%, at least 0.5 wt-%, at least 1 wt-%, at least 2 wt-%, or at least 5 wt-%, In certain embodiments, a cushion layer acrylate pressure-sensitive adhesive includes substantially no tackifiers and/or plasticizers. In this context, "substantially no" means less than 1 wt-%, less than 0.5 wt-%, or less than 0.1 wt-%, based on the total weight of the acrylate pressure-sensitive adhesive.

The copolymers and adhesives of the cushion layer may be prepared by any conventional polymerization method (such as solution polymerization or emulsion polymerization) including thermal bulk polymerization under adiabatic conditions, as is disclosed in U.S. Pat. No. 5,637,646 (Ellis) and U.S. Pat. No. 5,986,011 (Ellis et al.). Other methods of preparing (meth)acrylate copolymers include the continuous free radical polymerization methods described in U.S. Pat. No. 4,619,979 (Kotnour et al.) and U.S. Pat. No. 4,843,134 (Kotnour et al.), the polymerization within a polymeric package as described in U.S. Pat. No. 5,804,610 (Hamer et al.), and the on-web polymerization process as described in U.S. Pat. No. 4,181,752 (Martens et al.). Alternatively, the copolymers and adhesives of the cushion layer may be prepared as exemplified in the Examples Section.

Shell Layer Adhesive

A continuous shell layer (first and/or second) includes an adhesive (in certain embodiments, a pressure-sensitive adhesive) that has a Fox Tg of −20° C. to +50° C. In certain embodiments, the adhesive of the continuous shell layer has a Fox Tg of up to +40° C., up to +30° C., or up to +20° C. and at least −15° C., at least −10° C., at least −5° C., or at least 0° C.

A continuous shell layer (first and/or second) includes a copolymer having a weight average molecular weight of at least 100,000 Daltons. In certain embodiments, a shell layer copolymer has a weight average molecular weight of at least 150,000 Daltons, at least 200,000 Daltons, at least 250,000 Daltons, at least 300,000 Daltons, at least 350,000 Daltons, or at least 400,000 Daltons. In certain embodiments, a first shell layer copolymer has a weight average molecular weight of up to 2,000,000 Daltons, up to 1,500,000 Daltons, up to 1,000,000 Daltons, up to 700,000 Daltons, or up to 500,000 Daltons.

The continuous shell layer adhesive may be a pressure-sensitive adhesive.

The continuous shell layer adhesive copolymer includes:

a) one or more low Tg (meth)acrylate monomeric units of Formula (I) (which may be the same or different than that of the cushion layer):

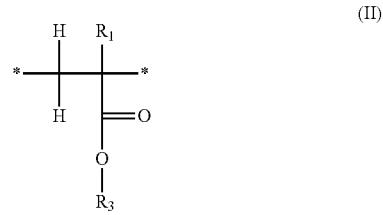

(II)

wherein:
R$_1$ is hydrogen or a methyl group; and
R$_3$ is an alkyl, heteroalkyl, aryl, aralkyl, or alkaryl group;

b) one or more polar monomeric units (which may be the same or different than that of the cushion layer); and c) one or more high Tg nonpolar monomeric units.

Herein, a low Tg monomeric unit is derived from a low Tg monomer, wherein a homopolymer of such monomer has a Tg of no greater than 0° C., no greater than −10° C., or no greater than −20° C.

Herein, a high Tg monomeric unit is derived from a high Tg monomer, wherein a homopolymer of such monomer has a Tg of greater than 0° C., greater than 10° C., greater than 20° C., or greater than 40° C.

The one or more low Tg (meth)acrylate monomeric units (a) of Formula (II) are present in a shell layer copolymer in an amount of at least 25 wt-%, at least 30 wt-%, at least 35 wt-%, or at least 40 wt-%, based on a total weight of monomeric units in the copolymer. In certain embodiments, a shell layer copolymer includes one or more low Tg (meth)acrylate monomeric units (a) of Formula (I) in an amount of up to 64.5 wt-%, up to 60 wt-%, up to 55 wt-%, or up to 50 wt-%, based on a total weight of monomeric units in the copolymer.

The one or more polar monomeric units (b) are present (i.e., they are present in an amount of greater than 0 wt-%) in a shell layer copolymer in an amount of up to 5 wt-%, up to 4.5 wt-%, up to 4 wt-%, or up to 3.5 wt-%, based on a total weight of monomeric units in the copolymer. In certain embodiments, a shell layer copolymer includes one or more polar monomeric units (b) in an amount of at least 0.5 wt-%, at least 1 wt-%, at least 1.5 wt-%, or at least 2 wt-%, based on a total weight of monomeric units in the copolymer.

The one or more high Tg nonpolar monomeric units (c) are present in a shell layer copolymer in an amount of at least 35 wt-%, at least 40 wt-%, at least 45 wt-%, or at least 50 wt-%, based on a total weight of monomeric units in the copolymer. In certain embodiments, a shell layer copolymer includes one or more high Tg nonpolar monomeric units in an amount of up to 74.5 wt-%, up to 70 wt-%, up to 65 wt-%, or up to 60 wt-%, based on a total weight of monomeric units in the copolymer.

Herein, the sum of all monomeric units (a), (b), and (c) and any optional monomeric units of the shell layer copolymer equals 100% by weight.

In Formula (II) of the monomeric units of the shell layer copolymer, $R_2$ is an alkyl, heteroalkyl, aryl, aralkyl, or alkaryl group. In certain embodiments of Formula (II) of the monomeric units of the shell layer copolymer, $R_2$ is an alkyl group having 2 to 24 carbon atoms. In certain embodiments of Formula (II), $R_3$ is an alkyl group having 4 to 24 carbon atoms, 4 to 20 carbon atoms, 2 to 20 carbon atoms, 4 to 12 carbon atoms, 2 to 12 carbon atoms, or 2 to 10 carbon atoms. In other embodiments, $R_3$ is a heteroalkyl, aryl, aralkyl, or alkaryl group. Heteroalkyl groups often have 2 to 24, 4 to 24 carbon atoms, 4 to 20 carbon atoms, or 4 to 12 carbon atoms. Aryl groups often have 6 to 24 carbon atoms, 6 to 20 carbon atoms, 6 to 12 carbon atoms, or 6 to 10 carbon atoms. Aralkyl and alkaryl groups often have an aryl or arylene portion with 6 to 20 carbon atoms, 6 to 12 carbon atoms, or 6 to 10 carbon atoms and an alkyl or alkylene portion with 1 to 10 carbon atoms, 1 to 6 carbon atoms, or 1 to 4 carbon atoms.

In certain embodiments, a shell layer copolymer includes one or more low Tg (meth)acrylate monomeric units of Formula (II) derived from monomers such as 2-ethylhexyl (meth)acrylate, ethyl acrylate, n-butyl acrylate, isobutyl acrylate, hexyl (meth)acrylate, 2-octyl acrylate, isooctyl acrylate, isononyl acrylate, isostearyl acrylate, 2-methylbutyl acrylate, and combinations thereof. In certain embodiments, a shell layer copolymer includes one or more low Tg (meth)acrylate monomeric units of Formula (II) derived from monomers selected from the group of 2-ethylhexyl acrylate, n-butyl acrylate, isooctyl acrylate, 2-octyl acrylate, and combinations thereof. Various isomer mixtures of the alkyl (meth)acrylates can be used such as those described, for example, in PCT Patent Application Publication WO 2012/088126 (Clapper et al.).

In certain embodiments, a shell layer copolymer includes one or more polar monomeric units derived from polar monomers as described above for the cushion layer.

In certain embodiments, a cushion layer (meth)acrylate copolymer includes one or more polar monomeric units having an acid group and an adjacent shell layer copolymer includes one or more polar monomeric units having a basic group. Alternatively, in certain embodiments, a cushion layer (meth)acrylate copolymer includes one or more polar monomeric units having a basic group and an adjacent shell layer copolymer includes one or more polar monomeric units having an acid group. This complementary orientation of acid- and base-containing monomeric units can enhance the adhesion between a cushion layer and a shell layer. Monomers with basic groups are often nitrogen-containing monomers such as those with a primary amido group, secondary amido group, or amino group.

In certain embodiments, a shell layer copolymer includes one or more polar monomeric units derived from monomers selected from the group of (meth)acrylic acid, (meth)acrylamide, alkyl-substituted (meth)acrylamides (e.g., N,N-dimethyl acrylamide), and combinations thereof.

In certain embodiments, a shell layer copolymer includes one or more high Tg nonpolar monomeric units derived from monomers selected from the group of styrene, substituted styrene (e.g., methyl styrene), isobornyl acrylate, methyl (meth)acrylate, tert-butyl (meth)acrylate, iso-butyl methacrylate, cyclohexyl (meth)acrylate, norbornyl (meth)acrylate, and combinations thereof. In certain embodiments, a shell layer copolymer includes one or more high Tg nonpolar monomeric units derived from monomers selected from the group of styrene, isobornyl (meth)acrylate, norbornyl acrylate, methyl (meth)acrylate, tert-butyl (meth)acrylate, iso-butyl methacrylate, cyclohexyl (meth)acrylate, octadecyl acrylate, and combinations thereof.

One or more other monomeric units may be included in a shell layer copolymer of the present disclosure.

In certain embodiments, a shell layer copolymer further comprises optional monomers such as vinyl acetate monomeric units. In certain embodiments, such vinyl acetate monomeric units are present in an amount of up to 7 wt-%, up to 5 wt-%, up to 3-wt-%, or up to 2 wt-%, based on the total weight of monomeric units in the copolymer.

In addition to a copolymer as described herein, in certain embodiments, a shell layer adhesive further includes one or more additives selected from the group of colorants (e.g., UV-fluorescent molecules), fillers, flame retardants, antioxidants, UV-stabilizers, viscosity modifiers, and combinations thereof. For example, antioxidants and/or UV stabilizers such as hydroquinone monomethyl ether (4-methoxyphenol, MeHQ), and that available under the trade name IRGANOX 1010 (tetrakis(methylene(3,5-di-tert-butyl-4-hydroxyhydrocinnamate))methane) from BASF Corp., can be mixed into the cushion layer (meth)acrylate copolymer to increase its temperature stability. If used, an antioxidant and/or stabilizer is typically used in the range of 0.01 wt-% to 1.0 wt-%, based on the total weight of the adhesive.

In certain embodiments, a shell layer adhesive includes tackifiers and/or plasticizers in a combined amount of no more than 20 wt-%. In certain embodiments, a shell layer adhesive includes substantially no tackifiers and/or plasticizers. In this context, "substantially no" means less than 1 wt-%, less than 0.5 wt-%, or less than 0.1 wt-%, based on the total weight of the adhesive.

The copolymers and adhesives of the shell layer may be prepared by any conventional polymerization method (such as solution polymerization or emulsion polymerization) including thermal bulk polymerization under adiabatic conditions, as is disclosed in, for example, U.S. Pat. No. 5,637,646 (Ellis) and U.S. Pat. No. 5,986,011 (Ellis et al.). Other methods of preparing (meth)acrylate copolymers include the continuous free radical polymerization methods described in U.S. Pat. No. 4,619,979 (Kotnour et al.) and U.S. Pat. No. 4,843,134 (Kotnour et al.), the polymerization within a polymeric package as described in U.S. Pat. No. 5,804,610 (Hamer et al.), and the on-web polymerization process as described in U.S. Pat. No. 4,181,752 (Martens et al.). Alternatively, the copolymers and adhesives of the shell layer may be prepared as exemplified in the Examples Section.

Backings and Adhesive Articles

The adhesive articles of the present disclosure may be in the form of a tape or a die-cut article (e.g., labels, shaped graphic components).

Referring to FIG. 1, an adhesive article (e.g., tape) 10 includes a flexible backing 12, a first cushion layer 20 permanently bonded to a first surface 14 of the flexible backing 12, and a first continuous shell layer 22 adjacent the first cushion layer 20. Such articles can be single-sided adhesive articles (e.g., tapes or labels). In certain embodiments, such an adhesive article may further include a low adhesion backsize (a LAB) (not shown) on a second surface 16 of the flexible backing 12. A LAB is typically used in a tape on the surface of a backing opposite the surface on which the adhesive is disposed to allow a tape to unwind easily. Suitable LAB materials are described, for example, in U.S. Pat. No. 6,919,405 (Kinning et al.).

Alternatively, in certain embodiments, an adhesive article of the present disclosure includes a second cushion layer permanently bonded to a second surface (i.e., second side) of the flexible backing, and a second continuous shell layer adjacent the second cushion layer. Such double-sided adhesive articles (e.g., tapes) may further include a release liner disposed on one of the first shell layer and/or the second shell layer. Release liners, which are removed before use of the adhesive article, include any suitable flexible material without specific limitations. Suitable release liners are commercially available and well known to one of skill in the art.

The flexible backings of the present disclosure may be any of a wide variety that are typically used in adhesive articles, particularly adhesive tapes. In certain embodiments, a flexible backing includes a material selected from the group of paper (e.g., Kraft paper) and polymeric films (e.g., polypropylene, polyethylene, polyurethane, polyester (e.g., polyethylene tereplithalate), ethylene vinyl acetate, polyvinyl chloride (vinyl), cellulose acetate, and ethyl cellulose). The backing materials can be in the form of a nonwoven web, extruded film, metal foil or sheet backing (for example, retro-reflective or graphic film sheets).

Various well-known techniques of applying the cushion and shell layers can be used, including various wet coating methods (direct or indirect) and dry laminating methods, although dry laminating methods may not be as desirable as wet coating methods (e.g., knife coating, roll coating, gravure coating, rod coating, curtain coating, and air knife coating).

Every interface in an adhesive article is a potential failure interface which can diminish the ultimate potential strength of the adhesive bond. By utilizing the complementary orientation of acid- and base-containing monomeric units in the cushion and shell layers as described above, it is possible to enhance the interfacial bond between these layers to reduce or eliminate the possibility of bond failure at this two-layer interface. In other embodiments, techniques to enhance this bond include e-beam crosslinking the total tape construction after both layers are applied to a backing, UV post-curing the adhesives to directly crosslink the cushion and shell layers, and directly polymerizing one layer on top of the other to promote interpenetrating networks at the two-layer interface.

In still other embodiments, a cushion layer and/or shell layer comprises a surface treatment (e.g., plasma treatment, corona treatment, or chemical primer) to enhance adhesion to each other. Thus, the cushion layer and the shell layer may be separated by one or more other materials, such as a chemical primer layer. Alternatively, in certain embodiments, a shell layer is directly disposed on a cushion layer (e.g., without a chemical primer). In certain embodiments, a surface of the flexible backing includes a surface treatment (e.g., plasma treatment, corona treatment, or chemical primer) to enhance adhesion of a cushion layer. Thus, the flexible backing and the cushion layer may be separated by one or more other materials, such as a chemical primer layer. Alternatively, in certain embodiments, a cushion layer is directly disposed on a surface of the flexible backing (e.g., without a chemical primer). Suitable surface treatments are well known to those skilled in the art and include coronas, plasmas, and flames, as described, for example in U.S. Pat. No. 4,828,871 (Strobel; PSA adhesion improved by plasma) and International Pub. No. WO 2012/152710 (Tesa; PSA adhesion improved by corona or flame).

Various combinations of these techniques can be used if desired to enhance adhesion between a cushion layer and a shell layer or between a flexible backing and a cushion layer.

EMBODIMENTS

Embodiment 1 is an adhesive article comprising:
a flexible backing;
a first cushion layer permanently bonded to a first surface of the flexible backing, wherein the first cushion layer:
has an average thickness of at least 10 micrometers; and
comprises an acrylate pressure-sensitive adhesive having a Fox Tg of up to −30° C., wherein the acrylate pressure-sensitive adhesive comprises a (meth)acrylate copolymer comprising:
a) one or more (meth)acrylate monomeric units of Formula (I) in an amount of at least 60 wt-% (or at least 65 wt-%, or at least 70 wt-%, at least 75 wt-%, or at least 80 wt-%), based on a total weight of monomeric units in the (meth)acrylate copolymer:

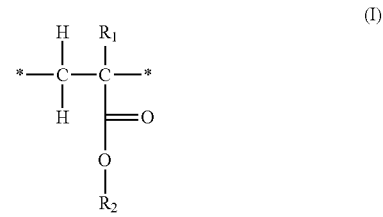

wherein:
R$_1$ is hydrogen or a methyl group; and
R$_2$ is an alkyl, heteroalkyl, aryl, aralkyl, or alkaryl group; with the proviso that the first monomeric unit of Formula (I) with R$_2$ having at least 8 carbon atoms is present in an amount of at least 20 wt-% (or at least 30 wt-%, or at least 40 wt-%), based on a total weight of monomeric units in the (meth)acrylate copolymer; and
b) one or more polar monomeric units in an amount of up to 7 wt-% (or up to 6 wt-%, or up to 5 wt-%, or up to 4 wt-%), based on a total weight of monomeric units in the (meth)acrylate copolymer;
wherein the sum of all monomeric units of the first cushion layer (meth)acrylate copolymer equals 100% by weight; and
a first continuous shell layer adjacent the first cushion layer, wherein:
the first continuous shell layer has an average thickness of up to 25 micrometers;
the ratio of the first cushion layer average thickness to the first shell layer average thickness is at least 2:1;
the first continuous shell layer comprises an adhesive (in certain embodiments, the adhesive is a pressure-sensitive adhesive) having a Fox Tg of −20° C. to +50° C.; and
the first continuous shell layer adhesive comprises a copolymer having a weight average molecular weight of at least 100,000 Daltons, wherein the copolymer comprises:
a) one or more low Tg (meth)acrylate monomeric units of Formula (II) in an amount of at least 25 wt-% (or at least 30 wt-%, or at least 35 wt-%, or at least 40 wt-%), based on a total weight of monomeric units in the copolymer:

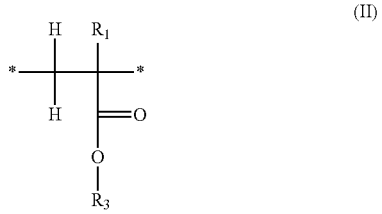

wherein:
R$_1$ is hydrogen or a methyl group; and
R$_3$ is an alkyl, heteroalkyl, aryl, aralkyl, or alkaryl group;
b) one or more polar monomeric units in an amount of up to 5 wt-% (or up to 4.5 wt-%, or up to 4 wt-%, or up to 3.5 wt-%), based on a total weight of monomeric units in the copolymer; and
c) one or more high Tg nonpolar monomeric units in an amount of at least 35 wt-% (or at least 40 wt-%, or at least 45 wt-%, or at least 50 wt-%), based on a total weight of monomeric units in the copolymer;
wherein the sum of all monomeric units of the first shell layer copolymer equals 100% by weight.

Embodiment 2 is the adhesive article of embodiment 1 wherein the acrylate pressure-sensitive adhesive of the first cushion layer has a Fox Tg of at least −85° C.

Embodiment 3 is the adhesive article of embodiment 1 or 2 wherein the first cushion layer has an average thickness of up to 150 micrometers (or up to 100 micrometers, or up to 50 micrometers).

Embodiment 4 is the adhesive article of any one of the previous embodiments wherein the first shell layer has an average thickness of up to 20 micrometers (or up to 12 micrometers, or up to 10 micrometers, or up to 8 micrometers, or up to 6 micrometers, or up to 4 micrometers, or up to 2 micrometers).

Embodiment 5 is the adhesive article of any one of the previous embodiments wherein the ratio of the first cushion layer average thickness to the first shell layer average thickness is at least 3:1 (or at least 4:1, or at least 5:1, or at least 10:1, or at least 20:1, or at least 50:1, or at least 70:1).

Embodiment 6 is the adhesive article of any one of the previous embodiments wherein the ratio of the first cushion layer average thickness to the first shell layer average thickness is up to 300:1 (or up to 200:1, or up to 100:1).

Embodiment 7 is the adhesive article of any one of the previous embodiments wherein the adhesive of the first shell layer has a Fox Tg of up to +40° C. (or up to +30° C., or up to +20° C.).

Embodiment 8 is the adhesive article of any one of the previous embodiments wherein the first cushion layer (meth)acrylate copolymer comprises one or more (meth)acrylate monomeric units of Formula (I) in an amount of up to 99.5 wt-% (or up to 95 wt-%, or up to 90 wt-%, or up to 85 wt-%), based on a total weight of monomeric units in the (meth)acrylate copolymer.

Embodiment 9 is the adhesive article of any one of the previous embodiments wherein the first cushion layer (meth)acrylate copolymer comprises one or more polar monomeric units in an amount of at least 0.5 wt-% (or at least 1 wt-%, or at least 1.5 wt-%, or at least 2 wt-%, or at least 2.5 wt-%, or at least 3 wt-%), based on a total weight of monomeric units in the (meth)acrylate copolymer.

Embodiment 10 is the adhesive article of any one of the previous embodiments wherein the first cushion layer (meth)acrylate copolymer comprises one or more (meth)acrylate monomeric units of Formula (I) wherein R$_2$ is an alkyl group having 1 to 24 carbon atoms.

Embodiment 11 is the adhesive article of embodiment 10 wherein the first cushion layer (meth)acrylate copolymer comprises one or more (meth)acrylate monomeric units of Formula (I) derived from monomers selected from the group of 2-ethylhexyl (meth)acrylate, methyl (meth)acrylate, ethyl (meth)acrylate, n-butyl (meth)acrylate, isobutyl (meth)acrylate, cyclohexyl (meth)acrylate, hexyl (meth)acrylate, 2-octyl (meth)acrylate, isooctyl (meth)acrylate, isononyl (meth)acrylate, isobornyl (meth)acrylate, norbornyl (meth)acrylate, isostearyl (meth)acrylate, behenyl (meth)acrylate, 2-methylbutyl (meth)acrylate, and combinations thereof (in certain embodiments, these monomers are selected from the group of 2-ethylhexyl acrylate, n-butyl acrylate, isooctyl acrylate, 2-octyl acrylate, and combinations thereof).

Embodiment 12 is the adhesive article of any one of the previous embodiments wherein the first cushion layer (meth)acrylate copolymer comprises one or more polar monomeric units derived from monomers selected from the group of (meth)acrylic acid, (meth)acrylamide, alkyl-substituted (meth)acrylamides (e.g., N,N-dimethyl acrylamide), and combinations thereof.

Embodiment 13 is the adhesive article of any one of the previous embodiments wherein the first shell layer copolymer comprises one or more low Tg (meth)acrylate monomeric units of Formula (I) in an amount of up to 64.5 wt-% (or up to 60 wt-%, or up to 55 wt-%, or up to 50 wt-%), based on a total weight of monomeric units in the copolymer.

Embodiment 14 is the adhesive article of any one of the previous embodiments wherein the first shell layer copolymer comprises one or more polar monomeric units in an amount of at least 0.5 wt-% (or at least 1 wt-%, or at least 1.5 wt-%, or at least 2 wt-%), based on a total weight of monomeric units in the copolymer.

Embodiment 15 is the adhesive article of any one of the previous embodiments wherein the first shell layer copolymer comprises one or more high Tg nonpolar monomeric units in an amount of up to 74.5 wt-% (or up to 70 wt-%, or up to 65 wt-%, or up to 60 wt-%), based on a total weight of monomeric units in the copolymer.

Embodiment 16 is the adhesive article of any one of the previous embodiments wherein the first shell layer copolymer comprises one or more low Tg (meth)acrylate monomeric units of Formula (II) wherein $R_3$ is an alkyl group having 2 to 24 carbon atoms (in certain embodiments, 4 to 24 carbon atoms).

Embodiment 17 is the adhesive article of embodiment 16 wherein the first shell layer copolymer comprises one or more low Tg (meth)acrylate monomeric units of Formula (II) derived from monomers selected from the group of 2-ethylhexyl (meth)acrylate, ethyl acrylate, n-butyl acrylate, isobutyl acrylate, hexyl (meth)acrylate, 2-octyl acrylate, isooctyl acrylate, isononyl acrylate, isostearyl acrylate, 2-methylbutyl acrylate, and combinations thereof (in certain embodiments, these monomers are selected from the group of 2-ethylhexyl acrylate, n-butyl acrylate, isooctyl acrylate, 2-octyl acrylate, and combinations thereof).

Embodiment 18 is the adhesive article of any one of the previous embodiments wherein the first shell layer copolymer comprises one or more polar monomeric units derived from monomers selected from the group of (meth)acrylic acid, (meth)acrylamide, alkyl-substituted (meth)acrylamides (e.g., N,N-dimethyl acrylamide), and combinations thereof.

Embodiment 19 is the adhesive article of any one of the previous embodiments wherein the first shell layer copolymer comprises one or more high Tg nonpolar monomeric units derived from monomers selected from the group of styrene, substituted styrene (e.g., methyl styrene), isobornyl acrylate, methyl (meth)acrylate, tert-butyl (meth)acrylate, iso-butyl methacrylate, cyclohexyl (meth)acrylate, norbornyl (meth)acrylate, and combinations thereof (in certain embodiments, these monomers are selected from the group of styrene, isobornyl (meth)acrylate, norbornyl acrylate, methyl (meth)acrylate, tert-butyl (meth)acrylate, iso-butyl methacrylate, cyclohexyl (meth)acrylate, and combinations thereof).

Embodiment 20 is the adhesive article of any one of the previous embodiments wherein the first cushion layer (meth)acrylate copolymer further comprises vinyl acetate monomeric units in an amount of up to 7 wt-%, based on the total weight of monomeric units in the copolymer.

Embodiment 21 is the adhesive article of any one of the previous embodiments wherein the first shell layer copolymer further comprises vinyl acetate monomeric units in an amount of up to 7 wt-%, based on the total weight of monomeric units in the copolymer.

Embodiment 22 is the adhesive article of any one of the previous embodiments wherein the first cushion layer (meth)acrylate copolymer comprises one or more polar monomeric units having an acid group and the first shell layer copolymer comprises one or more polar monomeric units having a basic group.

Embodiment 23 is the adhesive article of any one of the previous embodiments wherein the first cushion layer (meth)acrylate copolymer comprises one or more polar monomeric units having a basic group and the first shell layer copolymer comprises one or more polar monomeric units having an acidic group.

Embodiment 24 is the adhesive article of any one of the previous embodiments wherein the first cushion layer (meth)acrylate copolymer has a weight average molecular weight of at least 100,000 Daltons (or at least 200,000 Daltons, or at least 400,000 Daltons).

Embodiment 25 is the adhesive article of any one of the previous embodiments wherein the first cushion layer (meth)acrylate copolymer has a weight average molecular weight of up to 2,000,000 Daltons (or up to 1,000,000 Daltons, or up to 700,000 Daltons, or up to 500,000 Daltons).

Embodiment 26 is the adhesive article of any one of the previous embodiments wherein the first shell layer copolymer has a weight average molecular weight of up to 2,000,000 Daltons (or up to 1,000,000 Daltons, or up to 700,000 Daltons, or up to 500,000 Daltons).

Embodiment 27 is the adhesive article of any one of the previous embodiments wherein the first shell layer copolymer has a weight average molecular weight of at least 200,000 Daltons (or at least 300,000 Daltons, or at least 400,000 Daltons).

Embodiment 28 is the adhesive article of any one of the previous embodiments wherein the first cushion layer acrylate pressure-sensitive adhesive further comprises one or more additives selected from the group of colorants, fillers, flame retardants, antioxidants, UV-stabilizers, viscosity modifiers, and combinations thereof.

Embodiment 29 is the adhesive article of any one of the previous embodiments wherein the first shell layer adhesive further comprises one or more additives selected from the group of colorants (e.g., UV-fluorescent molecules), fillers, flame retardants, antioxidants, UV-stabilizers, viscosity modifiers, and combinations thereof.

Embodiment 30 is the adhesive article of any one of the previous embodiments wherein the first cushion layer acrylate pressure-sensitive adhesive includes tackifiers and/or plasticizers in a combined amount of no more than 20 wt-%.

Embodiment 31 is the adhesive article of embodiment 30 wherein the first cushion layer acrylate pressure-sensitive adhesive includes substantially no tackifiers and/or plasticizers.

Embodiment 32 is the adhesive article of any one of the previous embodiments wherein the first shell layer adhesive includes tackifiers and/or plasticizers in a combined amount of no more than 20 wt-0.

Embodiment 33 is the adhesive article of embodiment 32 wherein the first shell layer adhesive includes substantially no tackifiers and/or plasticizers.

Embodiment 34 is the adhesive article of any one of the previous embodiments wherein the flexible backing comprises a material selected from the group of paper (e.g., Kraft paper) and polymeric films (e.g., polypropylene, polyethylene, polyurethane, polyester (e.g., polyethylene terephthalate), ethylene vinyl acetate, cellulose acetate, and ethyl cellulose).

Embodiment 35 is the adhesive article of any one of the previous embodiments wherein the first surface of the flexible backing comprises a surface treatment (e.g., plasma treatment, corona treatment, or chemical primer).

Embodiment 36 is the adhesive article of any one of the previous embodiments wherein the first cushion layer is directly disposed on the first surface of the flexible backing (e.g., without a chemical primer).

Embodiment 37 is the adhesive article of any one of the previous embodiments wherein the first cushion layer comprises a surface treatment (e.g., plasma treatment, corona treatment, or chemical primer).

Embodiment 38 is the adhesive article of any one of the previous embodiments wherein the first shell layer is directly disposed on the first cushion layer (e.g., without a chemical primer).

Embodiment 39 is the adhesive article of any one of embodiments 1 through 38 which is a die-cut article.

Embodiment 40 is the adhesive article of any one of embodiments 1 through 38 which is a tape.

Embodiment 41 is the adhesive article of any one of the previous embodiments which demonstrates an increase (in certain embodiments, at least a two-fold increase, or at least a three-fold increase) in 180° angle peel adhesion strength at a peel rate of 0.2 inch/minute (0.08 millimeter/second) from stainless steel at room temperature compared to an adhesive article having the same flexible backing and first cushion layer but without the first shell layer.

Embodiment 42 is the adhesive article of any one of the previous embodiments which demonstrates an increase (in certain embodiments, at least a two-fold increase, or at least a three-fold increase) in 180° angle peel adhesion strength at a peel rate of 0.2 inch/minute (0.08 millimeter/second) from stainless steel or polypropylene at a temperature of up to 65° C. compared to an adhesive article having the same flexible backing and first cushion layer but without the first shell layer.

Embodiment 43 is the adhesive article of embodiment 41 or 42 which demonstrates an average rolling ball stopping distance according to a Rolling Ball Tack Test of at least 200 mm (or at least 300 mm, or at least 400 mm).

Embodiment 44 is the adhesive article of any one of the previous embodiments further comprising an LAB on a second surface of the flexible backing.

Embodiment 45 is the adhesive article of any one of embodiments 1 through 43 further comprising:

a second cushion layer permanently bonded to a second surface of the flexible backing, wherein the second cushion:
has an average thickness of at least 10 micrometers; and
comprises an acrylate pressure-sensitive adhesive having
a Fox Tg of up to −30° C., wherein the acrylate pressure-sensitive adhesive comprises a (meth)acrylate copolymer comprising:
a) one or more (meth)acrylate monomeric units of Formula (I) in an amount of at least 60 wt-% (or at least 65 wt-%, or at least 70 wt-%, or at least 75 wt-%, or at least 80 wt-%), based on a total weight of monomeric units in the (meth)acrylate copolymer:

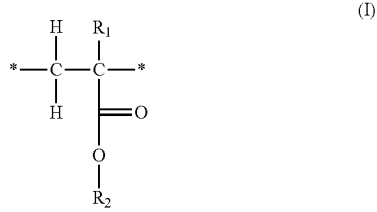

(I)

wherein:
$R_1$ is hydrogen or a methyl group; and
$R_2$ is an alkyl, heteroalkyl, aryl, aralkyl, or alkaryl group; with the proviso that the second monomeric unit of Formula (I) with $R_2$ having at least 8 carbon atoms is present in an amount of at least 20 wt-% (or at least 30 wt-%, or at least 40 wt-%), based on a total weight of monomeric units in the (meth)acrylate copolymer; and
b) one or more polar monomeric units in an amount of up to 7 wt-% (or up to 6 wt-%, or up to 5 wt-%, or up to 4 wt-%), based on a total weight of monomeric units in the (meth)acrylate copolymer;
wherein the sum of all monomeric units of the second cushion layer (meth)acrylate copolymer equals 100% by weight; and a second continuous shell layer adjacent the second cushion layer, wherein:
the second continuous shell layer has an average thickness of up to 25 micrometers;
the ratio of the second cushion layer average thickness to the second shell layer average thickness is at least 2:1;
the second continuous shell layer comprises an adhesive (in certain embodiments, the adhesive is a pressure-sensitive adhesive) having a Fox Tg of −20° C. to +50° C.; and
the second continuous shell layer adhesive comprises a copolymer having a weight average molecular weight of at least 100,000 Daltons, wherein the copolymer comprises:
a) one or more low Tg (meth)acrylate monomeric units of Formula (II) in an amount of at least 25 wt-% (or at least 30 wt-%, or at least 35 wt-%, or at least 40 wt-%), based on a total weight of monomeric units in the copolymer:

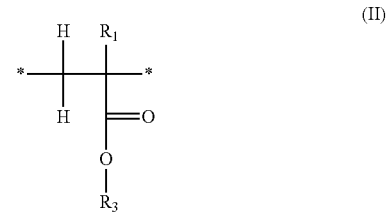

(II)

wherein:
$R_1$ is hydrogen or a methyl group; and
$R_3$ is an alkyl, heteroalkyl, aryl, aralkyl, or alkaryl group;
b) one or more polar monomeric units in an amount of up to 5 wt-%, based on a total weight of monomeric units in the copolymer; and
c) one or more high Tg nonpolar monomeric units in an amount of at least 35 wt-% (or at least 40 wt-%, or at least 45 wt-%, or at least 50 wt-%), based on a total weight of monomeric units in the copolymer;
wherein the sum of all monomeric units of the second shell layer copolymer equals 100% by weight.

Embodiment 46 is the adhesive article of embodiment 45 further comprising a release liner disposed on one of the first shell layer and/or the second shell layer.

Embodiment 47 is the adhesive article of embodiment 45 or 46 wherein the acrylate pressure-sensitive adhesive of the second cushion layer has a Fox Tg of at least −85° C.

Embodiment 48 is the adhesive article of any one of embodiments 45 through 47 wherein the second cushion layer has an average thickness of up to 150 micrometers (or up to 100 micrometers, or up to 50 micrometers).

Embodiment 49 is the adhesive article of any one of embodiments 45 through 48 wherein the second shell layer has an average thickness of up to 20 micrometers (or up to 12 micrometers, or up to 10 micrometers, or up to 8 micrometers, or up to 6 micrometers, or up to 4 micrometers, or up to 2 micrometers).

Embodiment 50 is the adhesive article of any one of embodiments 45 through 49 wherein the ratio of the second cushion layer average thickness to the second shell layer average thickness is at least 3:1 (or at least 4:1, or at least 5:1, or at least 10:1, or at least 20:1, or at least 50:1, or at least 70:1).

Embodiment 51 is the adhesive article of any one of embodiments 45 through 50 wherein the ratio of the second cushion layer average thickness to the second shell layer average thickness is up to 300:1 (or up to 200:1, or up to 100:1).

Embodiment 52 is the adhesive article of any one of embodiments 45 through 51 wherein the adhesive of the second shell layer has a Fox Tg of up to +40° C. (or up to +30° C., or up to +20° C.).

Embodiment 53 is the adhesive article of any one of embodiments 45 through 52 wherein the second cushion layer (meth)acrylate copolymer comprises one or more (meth)acrylate monomeric units of Formula (I) in an amount of up to 99.5 wt-% (or up to 95 wt-%, or up to 90 wt-%, or up to 85 wt-%), based on a total weight of monomeric units in the (meth)acrylate copolymer.

Embodiment 54 is the adhesive article of any one of embodiments 45 through 53 wherein the second cushion layer (meth)acrylate copolymer comprises one or more polar monomeric units in an amount of at least 0.5 wt-% (or at least 1 wt-%, at least 1.5 wt-%, at least 2 wt-%, at least 2.5 wt-%, or at least 3 wt-%), based on a total weight of monomeric units in the (meth)acrylate copolymer.

Embodiment 55 is the adhesive article of any one of embodiments 45 through 54 wherein the second cushion layer (meth)acrylate copolymer comprises one or more (meth)acrylate monomeric units of Formula (I) wherein $R_2$ is an alkyl group having 1 to 24 carbon atoms.

Embodiment 56 is the adhesive article of embodiment 55 wherein the second cushion layer (meth)acrylate copolymer comprises one or more (meth)acrylate monomeric units of Formula (I) derived from monomers selected from the group of 2-ethylhexyl (meth)acrylate, methyl (meth)acrylate, ethyl (meth)acrylate, n-butyl (meth)acrylate, isobutyl (meth)acrylate, cyclohexyl (meth)acrylate, hexyl (meth)acrylate, 2-octyl (meth)acrylate, isooctyl (meth)acrylate, isononyl (meth) acrylate, isobornyl (meth)acrylate, norbornyl (meth) acrylate, isostearyl (meth)acrylate, behenyl (meth)acrylate, 2-methylbutyl (meth)acrylate, and combinations thereof (in certain embodiments, these monomers are selected from the group of 2-ethylhexyl acrylate, n-butyl acrylate, isooctyl acrylate, 2-octyl acrylate, and combinations thereof).

Embodiment 57 is the adhesive article of any one of embodiments 45 through 56 wherein the second cushion layer (meth)acrylate copolymer comprises one or more polar monomeric units derived from monomers selected from the group of (meth)acrylic acid, (meth)acrylamide, alkyl-substituted (meth)acrylamides (e.g., N,N-dimethyl acrylamide), and combinations thereof.

Embodiment 58 is the adhesive article of any one of embodiments 45 through 57 wherein the second shell layer copolymer comprises one or more low Tg (meth)acrylate monomeric units of Formula (II) in an amount of up to 64.5 wt-% (or up to 60 wt-%, or up to 55 wt-%, or up to 50 wt-%), based on a total weight of monomeric units in the copolymer.

Embodiment 59 is the adhesive article of any one of embodiments 45 through 58 wherein the second shell layer copolymer comprises one or more polar monomeric units in an amount of at least 0.5 wt-% (or at least 1 wt-%, or at least 1.5 wt-%, or at least 2 wt-%), based on a total weight of monomeric units in the copolymer.

Embodiment 60 is the adhesive article of any one of embodiments 45 through 59 wherein the second shell layer copolymer comprises one or more high Tg nonpolar monomeric units in an amount of up to 74.5 wt-% (or up to 70 wt-%, or up to 65 wt-%, or up to 60 wt-%), based on a total weight of monomeric units in the copolymer.

Embodiment 61 is the adhesive article of any one of embodiments 45 through 60 wherein the second shell layer copolymer comprises one or more low Tg (meth)acrylate monomeric units of Formula (II) wherein $R_3$ is an alkyl group having 2 to 24 carbon atoms (in certain embodiments, 4 to 24 carbon atoms).

Embodiment 62 is the adhesive article of embodiment 61 wherein the second shell layer copolymer comprises one or more low Tg (meth)acrylate monomeric units of Formula (II) derived from monomers selected from the group of 2-ethylhexyl (meth)acrylate, ethyl acrylate, n-butyl acrylate, isobutyl acrylate, hexyl (meth)acrylate, 2-octyl acrylate, isooctyl acrylate, isononyl acrylate, isostearyl acrylate, 2-methylbutyl acrylate, and combinations thereof (in certain embodiments, 2-ethylhexyl acrylate, n-butyl acrylate, isooctyl acrylate, 2-octyl acrylate, and combinations thereof).

Embodiment 63 is the adhesive article of any one of embodiments 45 through 62 wherein the second shell layer copolymer comprises one or more polar monomeric units derived from monomers selected from the group of (meth)acrylic acid, (meth)acrylamide, alkyl-substituted (meth)acrylamides (e.g., N,N-dimethyl acrylamide), and combinations thereof.

Embodiment 64 is the adhesive article of any one of embodiments 45 through 63 wherein the second shell layer copolymer comprises one or more high Tg nonpolar monomeric units derived from monomers selected from the group of styrene, substituted styrene (e.g., methyl styrene), isobornyl acrylate, methyl (meth)acrylate, tert-butyl (meth)acrylate, iso-butyl methacrylate, cyclohexyl (meth)acrylate, norbornyl (meth)acrylate, and combinations thereof (in certain embodiments, these monomers are selected from the group of styrene, isobornyl (meth)acrylate, norbornyl acrylate, methyl (meth)acrylate, tert-butyl (meth)acrylate, iso-butyl methacrylate, cyclohexyl (meth)acrylate, and combinations thereof).

Embodiment 65 is the adhesive article of any one of embodiments 45 through 64 wherein the second cushion layer (meth)acrylate copolymer further comprises vinyl acetate monomeric units in an amount of up to 7 wt-%, based on the total weight of monomeric units in the copolymer.

Embodiment 66 is the adhesive article of any one of embodiments 45 through 65 wherein the second shell layer copolymer further comprises vinyl acetate monomeric units in an amount of up to 7 wt-%, based on the total weight of monomeric units in the copolymer.

Embodiment 67 is the adhesive article of any one of embodiments 45 through 66 wherein the second cushion layer (meth)acrylate copolymer comprises one or more polar monomeric units having an acid group and the second shell layer copolymer comprises one or more polar monomeric units having a basic group.

Embodiment 68 is the adhesive article of any one of embodiments 45 through 67 wherein the second cushion layer (meth)acrylate copolymer comprises one or more polar monomeric units having a basic group and the second shell layer copolymer comprises one or more polar monomeric units having an acidic group.

Embodiment 69 is the adhesive article of any one of embodiments 45 through 68 wherein the second cushion layer (meth)acrylate copolymer has a weight average molecular weight of at least 100,000 Daltons (or at least 200,000 Daltons, or at least 400,000 Daltons).

Embodiment 70 is the adhesive article of any one of embodiments 45 through 69 wherein the second cushion layer (meth)acrylate copolymer has a weight average molecular weight of up to 2,000,000 Daltons (or up to 1,000,000 Daltons, or up to 700,000 Daltons, or up to 500,000 Daltons).

Embodiment 71 is the adhesive article of any one of embodiments 45 through 70 wherein the second shell layer copolymer has a weight average molecular weight of up to 2,000,000 Daltons (or up to 1,000,000 Daltons, or up to 700,000 Daltons, or up to 500,000 Daltons).

Embodiment 72 is the adhesive article of any one of embodiments 45 through 71 wherein the second shell layer copolymer has a weight average molecular weight of at least 200,000 Daltons (or at least 300,000 Daltons, or at least 400,000 Daltons).

Embodiment 73 is the adhesive article of any one of embodiments 45 through 72 wherein the second cushion layer acrylate pressure-sensitive adhesive further comprises one or more additives selected from the group of colorants, fillers, flame retardants, antioxidants, UV-stabilizers, viscosity modifiers, and combinations thereof.

Embodiment 74 is the adhesive article of any one of embodiments 45 through 73 wherein the second shell layer adhesive further comprises one or more additives selected from the group of colorants (e.g., UV-fluorescent molecules), fillers, flame retardants, antioxidants, UV-stabilizers, viscosity modifiers, and combinations thereof.

Embodiment 75 is the adhesive article of any one of embodiments 45 through 74 wherein the second cushion layer acrylate pressure-sensitive adhesive includes tackifiers and/or plasticizers in a combined amount of no more than 20 wt-%.

Embodiment 76 is the adhesive article of embodiment 75 wherein the second cushion layer acrylate pressure-sensitive adhesive includes substantially no tackifiers and/or plasticizers.

Embodiment 77 is the adhesive article of any one of embodiments 45 through 76 wherein the second shell layer adhesive includes tackifiers and/or plasticizers in a combined amount of no more than 20 wt-%.

Embodiment 78 is the adhesive article of embodiment 77 wherein the second shell layer adhesive includes substantially no tackifiers and/or plasticizers.

Embodiment 79 is the adhesive article of any one of embodiments 45 through 78 wherein the second cushion layer is directly disposed on the second surface of the flexible backing (e.g., without a chemical primer).

Embodiment 80 is the adhesive article of any one of embodiments 45 through 79 wherein the second cushion layer comprises a surface treatment (e.g., plasma treatment, corona treatment, or chemical primer).

Embodiment 81 is the adhesive article of any one of embodiments 45 through 80 wherein the second shell layer is directly disposed on the second cushion layer (e.g., without a chemical primer).

Embodiment 82 is the adhesive article of any one of embodiments 45 through 81 which demonstrates an increase (in certain embodiments, at least a two-fold increase, or at least a three-fold increase) in 180° angle peel adhesion strength at a peel rate of 0.2 inch/minute (0.08 millimeter/second) from stainless steel at room temperature compared to an adhesive article having the same flexible backing and second cushion layer but without the second shell layer.

Embodiment 83 is the adhesive article of embodiment 82 which demonstrates an increase (in certain embodiments, at least a two-fold increase, or at least a three-fold increase) in 180° angle peel adhesion strength at a peel rate of 0.2 inch/minute (0.08 millimeter/second) from stainless steel or polypropylene at a temperature of up to 65° C. compared to an adhesive article having the same flexible backing and second cushion layer but without the second shell layer.

Embodiment 84 is the adhesive article of embodiment 82 or 83 which demonstrates an average rolling ball stopping distance according to a Rolling Ball Tack Test of at least 200 mm (or at least 300 mm, or at least 400 mm).

EXAMPLES

Objects and advantages of this disclosure are further illustrated by the following examples, but the particular materials and amounts thereof recited in these examples, as well as other conditions and details, should not be construed to unduly limit this disclosure.

Unless otherwise noted, all parts, percentages, ratios, etc. in the examples and the rest of the specification are by weight, and all reagents used in the examples were obtained, or are available, from general chemical suppliers such as, for example, Sigma-Aldrich, Saint Louis, Mo., or may be synthesized by conventional methods. The following abbreviations may be used in this section: mL=milliliter, sec=seconds, min=minutes, h=hours, g=gram, mg=milligram, mmol=millimole, ° C.=degrees Celsius, ° F.=degrees Fahrenheit.

Materials

| Designator | Description |
| --- | --- |
| IOA | Isooctyl acrylate, a monomer, obtained from 3M (St. Paul, MN, USA). |
| 2EHA | 2-ethylhexyl acrylate, a monomer, available from Sigma-Aldrich, St. Louis, MO. |
| IBOA | Isobornyl acrylate, a monomer, available from Sigma-Aldrich, St. Louis, MO. |
| AA | Acrylic acid, a monomer, available from Sigma-Aldrich, St. Louis, MO. |
| ACM | Acrylamide, a monomer, available from Zibo Xinye Chemical Company, Limited, Zibo City, Shandong Province, China. |
| NNDMA | N,N-dimethyl acrylamide, a monomer, available from Sigma-Aldrich, St. Louis, MO. |
| VAZO 52 | 2,2'-azobis(2,4-dimethylpentanenitrile), a thermally activated polymerization initiator, available under the trade designation VAZO 52 from The Chemours Company, Wilmington, DE. |
| VAZO 67 | 2,2'-azobis(2-methylbutanenitrile), a thermally activated polymerization initiator, available under the trade designation VAZO 67 from The Chemours Company, Wilmington, DE. |
| IOTG | Iso-octyl thioglycolate, a chain transfer agent, available from Evans Chemetics, Teaneck, NJ. |
| TDDM | Tertiary dodecyl mercaptan, a chain transfer agent, available from Sigma-Aldrich, St. Louis, MO. |
| PPET | A polyester terephthalate film having a thickness of 0.002 inch (51 micrometers), primed on one side with a plasma treatment and having a release coating on the opposite side. |

Test Methods
Peel Adhesion Strength

Peel adhesion strength was measured at various peel rates on the tapes prepared as described below. Stainless steel and polypropylene test panels, measuring 2 inches (5.1 centimeters) wide by 6 inches (15.2 centimeters) long were cleaned by wiping once with 2-butanone, once with heptane, and three times with acetone, all using a lint free tissue. The test panels were then allowed to dry at least 10 minutes before use. Adhesive tape specimens measuring 1 inch (2.54 centimeters) wide by between 6 inches (15.2 centimeters) to 7 inches (17.8 centimeters) long were applied to the panels then rolled down using a 2 kilogram (4.5 pound) hard rubber roller back and forth two times over the adhered tape specimens. To the free end of the adhesive tape was attached a strip of polyester backed PSA tape (3M 8403 HD, 3M Company, St. Paul, Minn.) measuring approximately 15 inches (38.1 centimeters) long which was folded back on itself to create a leader approximately 7 inches (17.8 centimeters) long. The test panel with tape specimen attached thereto was conditioned at 65° C. for 24 hours, and then equilibrated at 24° C. and 50% relative humidity for at least 16 hours prior to testing. Next, the test panel/tape specimen was secured in the lower grip of a tensile tester (Model 3365 Dual Column Table Frame, obtained from Instron, Norwood, Mass.) equipped with a 500 Newton load cell, and the tape leader was folded back and secured in the top grip to form a 180° peel angle. The tensile tester was programmed to automatically step through the various peel rates on a single tape specimen. Peel force was measured across 8 logarithmic peel rate steps from 8.47 millimeters per second (mm/sec) to 0.00847 mm/sec. The data acquisition rate was 10 data points per second. At each peel rate, the peel force was measured for a set acquisition time and the reported value is the average over the acquisition time. The first and last 10% of collected data points were not included in the calculation for each acquisition time.

| Peel Rate (millimeters/second) | Acquisition Time (seconds) |
| --- | --- |
| 8.47 | 4.5 |
| 0.847 | 11.3 |
| 0.0847 | 37.5 |
| 0.00847 | 150 |

The tensile tester was also equipped with a temperature control chamber (Model 3119-609, obtained from Instron, Norwood, Mass.) to allow testing at temperatures other than room temperature. When using the environmental chamber, test specimens were equilibrated in the chamber for at least 10 minutes prior to testing. The results were reported in Newtons/centimeter (N/cm).

Rolling Ball Tack

Tack was evaluated using a rolling ball tack test according to ASTM D3121-17, with the following modifications. The tape specimens were not conditioned in a humidity controlled environment prior to testing. The tape specimens were held in place with a strip of double-sided pressure sensitive adhesive tape (3M 665, 89 micrometers total thickness, 3M Company, St. Paul, Minn.) running the length of the specimen between the tape backing and the flat aluminum plate used as the work surface for testing. Chrome plated steel ball bearings conforming to ASTM A295/A295M-14 and measuring 11 millimeters in diameter and weighing 5.593+/−.003 grams were used. A RBT-100 rolling ball tack test ramp from Cheminstruments (Fairfield, Ohio) was employed. The rolling ball distance was taken as the average of four tests run on a single tape specimen.

Shell Layer Thickness

Tape specimens were embedded in STRUERS SPECIFIX 20 EPOXY (Struers, Cleveland, Ohio) and cross-section samples were cut perpendicular to the tape surface via cryomicrotomy at −30° C. Tapping Mode Atomic Force Microscopy (AFM) was performed on the cross-section samples. The contrast between the low glass transition temperature cushion layer and the high glass transition shell layer in the tapping mode AFM phase image allowed direct measurement of the shell layer thicknesses.

Gel Permeation Chromatography (GPC)

The molecular weight distribution of the compounds was characterized using conventional gel permeation chromatography (GPC). The GPC instrumentation, which was obtained from Waters Corporation (Milford, Mass., USA), included a high pressure liquid chromatography pump (Model 1515HPLC), an auto-sampler (Model 717), a UV detector (Model 2487), and a refractive index detector (Model 2410). The chromatograph was equipped with two 5 micrometer PLgel MIXED-D columns (available from Varian Incorporated, Palo Alto, Calif.). Samples of polymeric solutions were prepared by dissolving polymer or dried polymer materials in tetrahydrofuran at a concentration of 0.5 percent (weight/volume) and filtering through a 0.2 micrometer polytetrafluoroethylene filter (available from VWR International, West Chester, Pa.). The resulting samples were injected into the GPC and eluted at a rate of 1 milliliter per minute through the columns which were maintained at 35° C. The system was calibrated with polystyrene standards using a linear least square fit analysis to establish a calibration curve. The weight average molecular weight (Mw) and the polydispersity index (weight average molecular weight divided by number average molecular weight) were calculated for each sample against the standard calibration curve.

Glass Transition Temperature (Tg)

Fox Glass Transition Temperature (Tg) is a calculated value using the Fox equation. The calculation is based on the weighted average of the individual homopolymer glass transition values. For a copolymer prepared from n different monomers, the inverse of the Tg of the copolymer is equal to the summation of the weight fraction of each component divided by the Tg of that particular component. That is, for a copolymer prepared from n components, 1/Tg of the copolymer is equal to (weight fraction of component one÷Tg of component one)+(weight fraction of component two÷Tg of component two)+(weight fraction of component 3÷Tg of component 3)+ . . . +(weight fraction of component n÷Tg of component n).

General Preparation of Cushion Layer 1 (C1)

Cushion Layer 1 was prepared by adding 95 parts by weight (pbw) 2EHA, 5 pbw AA, 2 pbw of a 10 wt-% solution of VAZO 67 in ethyl acetate, 0.8 pbw of a 10 wt-% solution of TDDM in ethyl acetate, and 100 pbw ethyl acetate to a glass bottle. The solution was purged with nitrogen for four minutes before securely sealing the bottle, placing it in a rotating water bath at 60° C. for 24 hours, then allowing it to cool to ambient temperature to obtain an adhesive polymer solution having a solids content of approximately 50 wt-%. The resulting adhesive polymer solution was used to evaluate the polymer for its molecular weight and glass transition temperature as described in the test methods. The monomer composition, molecular weight, and glass transition temperature (Tg) are shown in Table 1.

Cushion Layers 2-4 (C2-C4)

Cushion Layers 2, 3, and 4 were prepared in a manner similar to that described above for preparing Cushion Layer 1. The solvent system for C3 was a mixture of ethyl acetate and heptane. The solvent system for C4 was a mixture of heptane and acetone. The resulting adhesive polymer solutions were used to evaluate the polymers for their molecular weights and glass transition temperatures as described in the test methods. The monomer compositions, molecular weights, and glass transition temperatures (Tg) are shown in Table 1.

Preparation of Shell Layer 1 (S1)

Shell Layer 1 was prepared by adding 50 parts by weight (pbw) 2EHA, 45 pbw IBOA, 5 pbw AA, 2 pbw of a 10 wt-% solution of VAZO 67 in ethyl acetate, 0.8 pbw of a 10 wt-% solution of TDDM in ethyl acetate, and 100 pbw ethyl acetate to a glass bottle. The solution was purged with nitrogen for four minutes before securely sealing the bottle, placing it in a rotating water bath at 60° C. for 24 hours, then allowing it to cool to ambient temperature to obtain an adhesive polymer solution having a solids content of approximately 50 wt-%. The resulting adhesive polymer solution was used to evaluate the polymer to determine the molecular weight and glass transition temperature as described in the test methods. The monomer composition, molecular weight, and glass transition temperature (Tg) are shown in Table 1.

Preparation of Shell Layers 2-6 (S2-S6)

Shell Layer 2 was prepared in a manner similar to that described above for preparing Shell Layer 1. Shell Layers 3-6 were prepared in a manner similar to that described above for preparing Shell Layer 1 with the following modifications. VAZO 52 (0.1 pbw dry weight) was used in place of VAZO 67, and IOTG (0.03 pbw dry weight) was used in place of TDDM. The resulting adhesive polymer solutions were used to evaluate the polymers for their molecular weights and glass transition temperatures as described in the test methods. The monomer compositions, molecular weights, and glass transition temperatures (Tg) are shown in Table 1.

Coating Methods

Method 1: Cushion Layer/Shell Layer Coatings

The adhesive polymer solutions for C1 and C2, prepared as described above, were coated onto the treated side of PPET film using a knife coating station having a gap setting of 0.008 inch (203 micrometers) greater than the film thickness. The coated PPET film samples were dried at 70° C. for at least 20 minutes to provide an estimated dried coating thickness of approximately 0.002 inch (51 micrometers).

The adhesive polymer solutions for S1 and S2, prepared as described above, diluted to 10 wt-% solids using a solvent mixture of ethyl acetate and 1-methoxy-2-propanol to provide a final solvent ratio of ethyl acetate:1-methoxy-2-propanol/75:25 (w:w), then coated onto the release treated side a release liner film using a #10 Mayer rod. The coated release film samples were dried at 70° C. for at least 20 minutes to achieve a dried coating thickness of approximately 1.25+/−0.25 micrometers as determined by microscopy using an optical interferometer.

After drying, the coated PPET films and release films were laminated together by hand at 24° C. using a rubber roller such that the cushion and shell layers contacted each other. The resulting constructions were crosslinked by electron beam (ebeam) (Model CB-300 ELECTROCURTAIN, from Energy Sciences, Incorporated, Wilmington, Mass.) using various beam current settings and an accelerating voltage of 220 kiloVolts. Samples were conveyed through the ebeam unit using a polyester carrier at a speed of 25.9 feet/minute (9 meters/minute) and irradiated from the release liner side, to provide the doses shown in Table 2. Samples of cushion layers alone between PPET and release liner films were also irradiated to provide comparative examples. The resulting tape constructions were evaluated for peel adhesion strength as described in the test methods. The results are shown in Tables 2-4.

Method 2: Cushion Layer/Shell Layer Coatings

The adhesive polymer solution for C3, prepared as described above, was coated onto the treated side of PPET film using a knife coating station having a gap setting of 0.014 inch (356 micrometers) greater than the film thickness. The adhesive polymer solution for C4, prepared as described above, was coated onto the treated side of PPET film using a knife coating station having a gap setting of 0.007 inch (178 micrometers) greater than the film thickness. The films were coated and dried at 20 feet/minute (6.1 meters/minute) by passing them through three heating zones. Zone 1: having temperature of 120° F. (49° C.) and a length of 9 feet (2.7 meters); Zone 2: having temperature of 140° F. (60° C.) and a length of 9 feet (2.7 meters); and Zone 3: having temperature of 210° F. (99° C.) and a length of 18 feet (5.4 meters). The average measured coating weight after drying was 45.6 grams/square meter, which corresponded to a coating thickness of approximately 0.0019 inch (48 micrometers) for both cushion layers.

The adhesive polymer solutions for S3-S6, prepared as described above, were used to prepare multilayer coated film constructions as follows. A shell layer adhesive polymer solution was diluted to 20 wt-% solids with ethyl acetate. An example was also run at 15 wt-% solids. The resulting solution was delivered to a 4-inch (10.2-centimeters) wide slot die coater, by means of a syringe pump at a flow rate of between 1.8 to 9.2 milliliters/minute, and thereby delivered through a 0.005-inch (127-micrometers) slot gap onto the surface of a dried cushion layer 3 or cushion layer 4 coated film to provide a smooth, continuous coating. The shell layer/cushion layer coated film was dried by passing it through two, five-foot long, in-line drying zones, both set at 88° C., at a rate of 5 feet/minute. The resulting constructions were crosslinked by electron beam (ebeam) as described in "Method 1: Cushion Layer/Shell Layer Coatings." Samples of cushion layers between PPET and release liner films were also irradiated to provide comparative examples. The resulting tape constructions were evaluated for peel adhesion strength, and in some cases rolling ball tack, as described in the test methods. In addition, the thicknesses of S3 and S4 were measured as described in the test method "Shell Layer Thickness." The thicknesses of S5 and S6 were assumed to be similar since the same coating process was used as for S3 and S4. The results are shown in Tables 2-5.

Compositions

TABLE 1

Cushion (C) and Shell (S) Layer Compositions

| Layer | IOA | 2EHA | IBOA | AA | ACM | NNDMA | Molecular Weight (Mw) (kg/mol) | Polydispersity Index | Glass Transition Temperature (° C.) |
|---|---|---|---|---|---|---|---|---|---|
| | | parts by weight (pbw) | | | | | | | |
| C1 | — | 95 | — | 5 | — | — | NT | NT | -45 |
| C2 | — | 95 | — | — | 2.5 | 2.5 | NT | NT | -45 |
| C3 | 96 | — | — | 4 | — | — | 1450 | 16.2 | -50 |
| C4 | 94 | — | — | 6 | — | — | 527 | 10.7 | -49 |
| S1 | — | 50 | 45 | 5 | — | — | 408 | 10.7 | 5 |
| S2 | — | 50 | 45 | — | 2.5 | 2.5 | 454 | 10.0 | 5 |
| S3 | — | 55 | 40 | 5 | — | — | 469 | 6.74 | -2 |
| S4 | — | 45 | 50 | 5 | — | — | 449 | 6.47 | 12 |
| S5 | — | 47 | 50 | — | 3 | — | NT | NT | 10 |
| S6 | — | 22 | 75 | — | 3 | — | NT | NT | 50 |

NT: not tested

Results

TABLE 2

Peel Adhesion Strength-at 65° C. on Polypropylene

| Ex. | Cushion/ Shell | Shell Layer Coating Solution (% Solids) | Shell Layer Coating Pump Speed (cc/min) | Shell Layer Thickness (micrometers) | Ebeam Dose MRads | Peel Adhesion Strength (N/cm) at 8.47 mm/sec | Peel Adhesion Strength (N/cm) at 0.847 mm/sec | Peel Adhesion Strength (N/cm) at 0.0847 mm/sec | Peel Adhesion Strength (N/cm) at 0.00847 mm/sec |
|---|---|---|---|---|---|---|---|---|---|
| CE 1 | C1/— | NA | NA | NA | 5 | 3.41 | 0.72 | 0.11 | 0.04 |
| CE 2 | C2/— | NA | NA | NA | 5 | 2.24 | 0.34 | 0.08 | 0.04 |
| CE 3 | C3/— | NA | NA | NA | 7 | 2.76 | 0.93 | 0.47 | 0.42 |
| CE 4 | C4/— | NA | NA | NA | 10 | 3.48 | 1.45 | 0.34 | 0.16 |
| 1 | C1/S1 | 10 | NA | 1.2 | 5 | 4.04 | 2.18 | 0.88 | 0.41 |
| 2 | C1/S2 | 10 | NA | 1.2 | 5 | 6.22 | 3.36 | 0.52 | 0.13 |
| 3 | C2/S1 | 10 | NA | 1.2 | 5 | 4.98 | 2.89 | 0.70 | 0.11 |
| 4 | C2/S2 | 10 | NA | 1.2 | 5 | 4.30 | 2.86 | 1.17 | 0.67 |
| 5 | C3/S3 | 15 | 1.8 | NT | 7 | 5.08 | 4.00 | 1.94 | 0.38 |
| 6 | C3/S3 | 20 | 2.3 | 4.9 | 7 | 5.07 | 3.92 | 2.97 | 1.17 |
| 7 | C3/S3 | 20 | 9.2 | 11.2 | 7 | 2.76 | 3.87 | 3.54 | 1.76 |
| 8 | C3/S4 | 20 | 2.3 | 4.1 | 7 | 2.45 | 3.52 | 2.48 | 1.49 |
| 9 | C4/S5 | 20 | 2.3 | ca. 4.5 | 10 | 5.39 | 3.12 | 1.51 | 0.20 |
| 10 | C4/S6 | 20 | 2.3 | ca. 4.5 | 10 | 2.46 | 3.03 | 2.88 | 1.16 |

CE: Comparative Example; NA: not applicable; NT: not tested
Ebeam Doses reported in Table 2 apply to the same C/S combinations in Tables 3-5

TABLE 3

Peel Adhesion Strength-at 24° C. on Stainless Steel

| Ex. | Cushion/ Shell | Shell Layer Coating Solution (% Solids) | Shell Layer Coating Pump Speed (cc/min) | Shell Layer Thickness (micrometers) | Peel Adhesion Strength (N/cm) at 8.47 mm/sec | Peel Adhesion Strength (N/cm) at 0.847 mm/sec | Peel Adhesion Strength (N/cm) at 0.0847 mm/sec | Peel Adhesion Strength (N/cm) at 0.00847 mm/sec |
|---|---|---|---|---|---|---|---|---|
| CE 5 | C1/— | NA | NA | NA | 8.56 | 4.81 | 2.40 | 1.01 |
| CE 6 | C2/— | NA | NA | NA | 7.03 | 3.47 | 1.25 | 0.51 |
| CE 7 | C3/— | NA | NA | NA | 7.77 | 4.13 | 1.86 | 0.79 |
| CE 8 | C4/— | NA | NA | NA | 10.72 | 6.24 | 3.48 | 1.57 |
| 11 | C1/S1 | 10 | NA | 1.2 | 13.76 | 8.54 | 5.25 | 2.02 |
| 12 | C1/S2 | 10 | NA | 1.2 | 9.11 | 5.77 | 3.33* | 1.59 |
| 13 | C2/S1 | 10 | NA | 1.2 | 14.13 | 8.60 | 4.76 | 2.23 |
| 14 | C2/S2 | 10 | NA | 1.2 | 12.13 | 7.60 | 5.20 | 2.44 |
| 15 | C3/S3 | 15 | 1.8 | NT | 10.18 | 8.88 | 7.22 | 4.95 |
| 16 | C3/S3 | 20 | 2.3 | 4.9 | 10.29 | 8.67 | 7.57 | 5.40 |
| 17 | C3/S3 | 20 | 9.2 | 11.2 | 10.42 | 9.26 | 7.56 | 5.34 |
| 18 | C3/S4 | 20 | 2.3 | 4.1 | 10.23 | 9.10 | 7.67 | 5.27 |

TABLE 3-continued

Peel Adhesion Strength-at 24° C. on Stainless Steel

| Ex. | Cushion/ Shell | Shell Layer Coating Solution (% Solids) | Shell Layer Coating Pump Speed (cc/min) | Shell Layer Thickness (micrometers) | Peel Adhesion Strength (N/cm) at 8.47 mm/sec | Peel Adhesion Strength (N/cm) at 0.847 mm/sec | Peel Adhesion Strength (N/cm) at 0.0847 mm/sec | Peel Adhesion Strength (N/cm) at 0.00847 mm/sec |
|---|---|---|---|---|---|---|---|---|
| 19 | C4/S5 | 20 | 2.3 | ca. 4.5 | 12.08 | 8.15 | 6.21 | 4.26 |
| 20 | C4/S6 | 20 | 2.3 | ca. 4.5 | 12.09 | 9.27 | 6.08 | 4.22 |

CE: Comparative Example; NA: not applicable; NT: not tested
*For some constructions, the peel adhesion strength was less than expected due to the coating method used to join the cushion and shell layers. For instance, Example 12 at 0.0847 mm/sec did not exhibit twice the peel adhesion strength of Comparative Example 5. This is believed to be due to the use of Coating Method 1 (dry lamination process) which, in some cases, may not provide sufficient interlayer adhesion between cushion and shell layers.

TABLE 4

Peel Adhesion Strength-at 65° C. on Stainless Steel

| Ex. | Cushion/ Shell | Shell Layer Coating Solution (% Solids) | Shell Layer Coating Pump Speed (cc/min) | Shell Layer Thickness (micrometers) | Peel Adhesion Strength (N/cm) at 8.47 mm/sec | Peel Adhesion Strength (N/cm) at 0.847 mm/sec | Peel Adhesion Strength (N/cm) at 0.0847 mm/sec | Peel Adhesion Strength (N/cm) at 0.00847 mm/sec |
|---|---|---|---|---|---|---|---|---|
| CE 9 | C1/— | NA | NA | NA | 7.14 | 3.76 | 1.98 | 1.08 |
| CE 10 | C2/— | NA | NA | NA | 3.77 | 2.04 | 1.04 | 0.54 |
| CE 11 | C3/— | NA | NA | NA | 3.92 | 2.07 | 1.14 | 0.67 |
| 21 | C1/S1 | 10 | NA | 1.2 | 6.81 | 3.20 | 1.34* | 0.67 |
| 22 | C1/S2 | 10 | NA | 1.2 | 6.80 | 3.22 | 0.65* | 0.18 |
| 23 | C2/S1 | 10 | NA | 1.2 | 6.24 | 3.36 | 0.63* | 0.13 |
| 24 | C2/S2 | 10 | NA | 1.2 | 5.39 | 2.69 | 1.23* | 0.69 |
| 25 | C3/S3 | 15 | 1.8 | NT | 7.11 | 4.28 | 2.33 | 0.68 |
| 26 | C3/S3 | 20 | 2.3 | 4.9 | 8.00 | 5.26 | 4.03 | 1.69 |
| 27 | C3/S3 | 20 | 9.2 | 11.2 | 7.36 | 5.91 | 3.59 | 2.15 |
| 28 | C3/S4 | 20 | 2.3 | 4.1 | 8.10 | 5.75 | 4.18 | 1.88 |

CE: Comparative Example; NA: not applicable; NT: not tested
*For some constructions, the peel adhesion strength was less than expected due to the coating method used to join the cushion and shell layers. For instance, Examples 21-24 at 0.0847 mm/sec did not exhibit twice the peel adhesion strength of Comparative Examples 9 and 10. This is believed to be due to the use of Coating Method 1 (dry lamination process) which, in some cases, may not provide sufficient interlayer adhesion between cushion and shell layers.

TABLE 5

Tack - Rolling Ball Distance

| Ex. | Cushion/ Shell | Shell Layer Coating Solution (% Solids) | Shell Layer Coating Pump Speed (cc/min) | Shell Layer Thickness (micrometers) | Rolling Ball Distance (millimeters) |
|---|---|---|---|---|---|
| CE 12 | C3/— | NA | NA | NA | 94 |
| CE 13 | C4/— | NA | NA | NA | 205 |
| 29 | C3/S3 | 20 | 2.3 | 4.9 | 499 |
| 30 | C3/S3 | 20 | 9.2 | 11.2 | >1000 |
| 31 | C3/S3 | 15 | 1.8 | NT | 436 |
| 32 | C3/S4 | 20 | 2.3 | 4.1 | 834 |

CE: Comparative Example;
NA: not applicable;
NT: not tested

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. An adhesive article comprising:

a flexible backing;

a first cushion layer permanently bonded to a first surface of the flexible backing, wherein the first cushion layer:

has an average thickness of at least 10 micrometers; and comprises an acrylate pressure-sensitive adhesive having a Fox Tg of up to −30° C., wherein the acrylate pressure-sensitive adhesive comprises a (meth)acrylate copolymer comprising:

a) one or more first (meth)acrylate monomeric units of Formula (I) in an amount of at least 60 wt-%, based on a total weight of monomeric units in the (meth)acrylate copolymer:

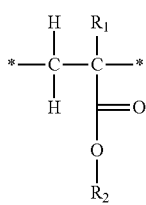

(I)

wherein:
R$_1$ is hydrogen or a methyl group; and
R$_2$ is an alkyl, heteroalkyl, aryl, aralkyl, or alkaryl group with the proviso that the one or more first (meth)acrylate monomeric units of Formula (I) with R$_2$ having at least 8 carbon atoms is present in an amount of at least 20 wt-%, based on a total weight of monomeric units in the (meth)acrylate copolymer; and
b) one or more polar monomeric units in an amount of up to 7 wt-%, based on a total weight of monomeric units in the (meth)acrylate copolymer;
wherein a total weight of all monomeric units of the (meth)acrylate copolymer of the first cushion layer (meth)acrylate copolymer equals 100% by weight; and
a first continuous shell layer adjacent the first cushion layer, wherein:
the first continuous shell layer has an average thickness of up to 25 micrometers;
the ratio of the first cushion layer average thickness to the first continuous shell layer average thickness is at least 2:1;
the first continuous shell layer comprises an adhesive having a Fox Tg of −20° C. to +50° C.; and
the adhesive of the first continuous shell layer comprises a copolymer having a weight average molecular weight of at least 100,000 Daltons, wherein the copolymer comprises:
a) one or more low Tg (meth)acrylate monomeric units of Formula (II) in an amount of at least 25 wt-%, based on a total weight of monomeric units in the copolymer, wherein the one or more low Tg (meth)acrylate monomeric units is characterized as a homopolymer of the one or more (meth)acrylate monomeric units having a Tg of no greater than 0° C.:

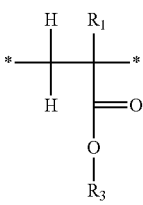

(II)

wherein:
R$_1$ is hydrogen or a methyl group; and
R$_3$ is an alkyl, heteroalkyl, aryl, aralkyl, or alkaryl group having 2 to 24 carbon atoms;
b) one or more polar monomeric units in an amount of up to 5 wt-%, based on a total weight of monomeric units in the copolymer; and c) one or more high Tg nonpolar monomeric units in an amount of at least 35 wt-%, based on a total weight of monomeric units in the copolymer, wherein the one or more high Tg (meth)acrylate monomeric units is characterized as a homopolymer of the one or more (meth)acrylate monomeric units having a Tg of greater than 0° C.;
wherein a total weight of all monomeric units of the copolymer of the first continuous shell layer equals 100% by weight.

2. The adhesive article of claim 1 wherein the acrylate pressure-sensitive adhesive of the first cushion layer has a Fox Tg of at least −85° C.

3. The adhesive article of claim 1 wherein the ratio of the first cushion layer average thickness to the first continuous shell layer average thickness is at least 3:1 and up to 300:1.

4. The adhesive article of claim 1 wherein R$_2$ of the one or more (meth)acrylate monomeric units of Formula (I) in the first cushion layer is an alkyl group having 1 to 24 carbon atoms.

5. The adhesive article of claim 4 wherein the one or more (meth)acrylate monomeric units of Formula (I) is derived from monomers selected from the group of 2-ethylhexyl (meth)acrylate, methyl (meth)acrylate, ethyl (meth)acrylate, n-butyl (meth)acrylate, isobutyl (meth)acrylate, cyclohexyl (meth)acrylate, hexyl (meth)acrylate, 2-octyl (meth)acrylate, isooctyl (meth)acrylate, isononyl (meth)acrylate, isobornyl (meth)acrylate, norbornyl (meth)acrylate, isostearyl (meth)acrylate, behenyl (meth)acrylate, 2-methylbutyl (meth)acrylate, and combinations thereof.

6. The adhesive article of claim 1 wherein the one or more polar monomeric units in the (meth)acrylate copolymer of the first cushion layer is derived from monomers selected from the group of (meth)acrylic acid, (meth)acrylamide, alkyl-substituted (meth)acrylamides, and combinations thereof.

7. The adhesive article of claim 1 wherein the one or more polar monomeric units of the copolymer in the first continuous shell layer is present in an amount of 0.5 wt-% to 5 wt-%, based on a total weight of monomeric units in the copolymer.

8. The adhesive article of claim 1 wherein R$_3$ in the one or more low Tg (meth)acrylate monomeric units of Formula (II) of the copolymer in the first continuous shell layer is an alkyl group having 2 to 24 carbon atoms.

9. The adhesive article of claim 8 wherein the one or more low Tg (meth)acrylate monomeric units of Formula (II) in the first continuous shell layer is derived from monomers selected from the group of 2-ethylhexyl (meth)acrylate, ethyl acrylate, n-butyl acrylate, isobutyl acrylate, hexyl (meth)acrylate, 2-octyl acrylate, isooctyl acrylate, isononyl acrylate, isostearyl acrylate, 2-methylbutyl acrylate, and combinations thereof.

10. The adhesive article of claim 1 wherein the one or more polar monomeric units in the copolymer of the first continuous shell layer is derived from monomers selected from the group of (meth)acrylic acid, (meth)acrylamide, alkyl-substituted (meth)acrylamides, and combinations thereof.

11. The adhesive article of claim 1 wherein the one or more high Tg nonpolar monomeric units in the copolymer of the first continuous shell layer is derived from monomers selected from the group of styrene, substituted styrene, isobornyl (meth)acrylate, methyl (meth)acrylate, tert-butyl (meth)acrylate, iso-butyl methacrylate, cyclohexyl (meth)acrylate, norbornyl (meth)acrylate, and combinations thereof.

12. The adhesive article of claim 1 wherein the (meth)acrylate copolymer in the first cushion layer further comprises vinyl acetate monomeric units in an amount of up to 7 wt-%, based on the total weight of monomeric units in the copolymer.

13. The adhesive article of claim 1 wherein the copolymer in the first continuous shell layer further comprises vinyl acetate monomeric units in an amount of up to 7 wt-%, based on the total weight of monomeric units in the copolymer.

14. The adhesive article of claim 1 wherein the one or more polar monomeric units of the (meth)acrylate copolymer in the first cushion layer has an acid group and the one or more polar monomeric units of the copolymer in the first continuous shell layer has a basic group.

15. The adhesive article of claim 1 wherein the one or more polar monomeric units of the (meth)acrylate copolymer in the first cushion layer has a basic group and the one or more polar monomeric units of the copolymer in the first continuous shell layer has an acidic group.

16. The adhesive article of claim 1 wherein the (meth)acrylate copolymer of the first cushion layer has a weight average molecular weight of at least 100,000 Daltons and up to 2,000,000 Daltons.

17. The adhesive article of claim 1 which demonstrates an increase in 180° angle peel adhesion strength at a peel rate of 0.2 in/min (0.08 mm/sec) from stainless steel at room temperature compared to an adhesive article having the same flexible backing and first cushion layer but without the first continuous shell layer.

18. The adhesive article of claim 17 which demonstrates at least an increase in 180° angle peel adhesion strength at a peel rate of 0.2 in/min (0.08 mm/sec) from stainless steel or polypropylene at a temperature of up to 65° C. compared to an adhesive article having the same flexible backing and first cushion layer but without the first continuous shell layer.

19. The adhesive article of claim 17 which demonstrates an average rolling ball stopping distance according to a Rolling Ball Tack Test of at least 200 mm.

20. The adhesive article of claim 1 further comprising:
a second cushion layer permanently bonded to a second surface of the flexible backing, wherein the second cushion:
has an average thickness of at least 10 micrometers; and
comprises the acrylate pressure-sensitive adhesive of the first cushion layer; and
a second continuous shell layer adjacent the second cushion layer, wherein:
the second continuous shell layer has an average thickness of up to 25 micrometers;
the ratio of the second cushion layer average thickness to the second shell layer average thickness is at least 2:1; and
the second continuous shell layer comprises the adhesive having a Fox Tg of −20° C. to +50° C. of the first continuous shell layer.

* * * * *